(12) United States Patent
Moon et al.

(10) Patent No.: US 11,190,526 B2
(45) Date of Patent: Nov. 30, 2021

(54) ELECTRONIC DEVICE AND METHOD FOR PROVIDING LOCATION DATA

(71) Applicant: Samsung Electronics Co., Ltd., Suwon-si (KR)

(72) Inventors: Jin-Ho Moon, Suwon-si (KR); Jong-Eun Yang, Seoul (KR); Jae-Yung Yeo, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 15/811,017

(22) Filed: Nov. 13, 2017

(65) Prior Publication Data

US 2018/0165468 A1 Jun. 14, 2018

(30) Foreign Application Priority Data

Dec. 12, 2016 (KR) .......................... 10-2016-0168566

(51) Int. Cl.
*G06F 21/62* (2013.01)
*H04L 29/06* (2006.01)
(Continued)

(52) U.S. Cl.
CPC .......... *H04L 63/105* (2013.01); *G01S 5/0263* (2013.01); *G06F 21/62* (2013.01);
(Continued)

(58) Field of Classification Search
CPC ...... G01S 5/0263; G06F 21/62; G06F 21/629; G06F 2221/21; H04L 63/105;
(Continued)

(56) References Cited

U.S. PATENT DOCUMENTS 6,480,784 B2 * 11/2002 Mizuno ................. G01C 21/26
    342/357.31
6,640,184 B1 * 10/2003 Rabe ....................... H04W 8/16
    701/517
(Continued)

FOREIGN PATENT DOCUMENTS

CN 102026090 A 4/2011
CN 104270717 A 1/2015
(Continued)

OTHER PUBLICATIONS

Chinese Office Action dated Aug. 21, 2020, issued in Chinese Patent Application No. 201711313672.8.

*Primary Examiner* — Michael Simitoski
(74) *Attorney, Agent, or Firm* — Jefferson IP Law, LLP

(57) ABSTRACT

An electronic device is provided. The electronic device includes a user interface, a location sensor configured to sense a location of the electronic device, a processor electrically connected with the user interface and the location sensor, and a memory electrically connected with the processor and configured to store a first application program and a second application program. The memory is further configured to store instructions that, when executed, enable the processor to receive first location data with a first degree of accuracy regarding the location of the electronic device from the location sensor, process at least part of the first location data to generate second location data with a second degree of accuracy lower than the first degree of accuracy regarding the location of the electronic device, provide the at least part of the first location data to execute the first application program, and provide at least part of the second location data to execute the second application program.

24 Claims, 21 Drawing Sheets

(51) Int. Cl.

| | | |
|---|---|---|
| *H04W 4/029* | (2018.01) | |
| *H04W 4/02* | (2018.01) | |
| *G01S 5/02* | (2010.01) | |
| *H04M 1/725* | (2021.01) | |
| *H04M 1/72403* | (2021.01) | |
| *H04W 12/084* | (2021.01) | |
| *H04W 12/02* | (2009.01) | |
| *H04W 4/80* | (2018.01) | |
| *H04W 64/00* | (2009.01) | |
| *H04M 1/72463* | (2021.01) | |

(52) U.S. Cl.
CPC .......... *G06F 21/629* (2013.01); *H04M 1/725* (2013.01); *H04M 1/72403* (2021.01); *H04W 4/02* (2013.01); *H04W 4/029* (2018.02); *H04W 12/084* (2021.01); *G06F 2221/21* (2013.01); *H04M 1/72463* (2021.01); *H04M 2250/10* (2013.01); *H04W 4/80* (2018.02); *H04W 64/00* (2013.01)

(58) Field of Classification Search
CPC ....... H04W 12/08; H04W 4/02; H04W 4/029; H04W 4/80; H04W 64/00
See application file for complete search history.

(56) References Cited

U.S. PATENT DOCUMENTS

| | | | |
|---|---|---|---|
| 7,558,696 B2 | 7/2009 | Vilppula et al. | |
| 8,612,756 B1* | 12/2013 | Meier | H04W 4/029 713/166 |
| 9,137,495 B2* | 9/2015 | Narasimhan | H04H 20/38 |
| 9,161,155 B2* | 10/2015 | Roh | H04W 4/029 |
| 9,294,912 B1* | 3/2016 | Flowerday | H04W 12/02 |
| 9,479,929 B1* | 10/2016 | Flowerday | H04W 12/02 |
| 9,603,011 B1* | 3/2017 | Flowerday | H04W 12/02 |
| 9,811,679 B2* | 11/2017 | Liu | G06F 21/6218 |
| 9,979,752 B1* | 5/2018 | Flowerday | H04W 12/02 |
| 10,019,592 B2* | 7/2018 | Nicolaou | G06F 21/6218 |
| 10,028,084 B2* | 7/2018 | Chen | H04W 4/02 |
| 10,069,703 B2* | 9/2018 | Jung | H04L 43/0876 |
| 2001/0055975 A1* | 12/2001 | McDonnell | H04L 29/06 455/456.6 |
| 2003/0050755 A1* | 3/2003 | Sakata | G01S 5/0009 701/300 |
| 2003/0187803 A1 | 10/2003 | Pitt | |
| 2008/0090592 A1* | 4/2008 | Tsuchiya | H04M 3/42042 455/456.6 |
| 2009/0005061 A1 | 1/2009 | Ward et al. | |
| 2009/0098888 A1* | 4/2009 | Yoon | H04M 1/72572 455/456.2 |
| 2010/0024045 A1* | 1/2010 | Sastry | G06F 21/6245 726/28 |
| 2010/0077484 A1* | 3/2010 | Paretti | H04W 4/21 726/26 |
| 2010/0195623 A1* | 8/2010 | Narasimhan | H04H 20/38 370/332 |
| 2010/0255856 A1* | 10/2010 | Kansal | G01S 5/0205 455/456.1 |
| 2010/0262360 A1* | 10/2010 | Hilliar Isaacson | G01C 21/20 701/532 |
| 2011/0084803 A1* | 4/2011 | Niemela | H04W 4/029 340/8.1 |
| 2011/0138480 A1* | 6/2011 | Janoulis | H04W 8/16 726/28 |
| 2012/0009900 A1* | 1/2012 | Chawla | G06Q 10/10 455/411 |
| 2012/0050033 A1* | 3/2012 | Westen | G01S 5/0027 340/539.13 |
| 2012/0100873 A1* | 4/2012 | Parupudi | G06F 16/9537 455/456.1 |
| 2012/0192247 A1* | 7/2012 | Oliver | G06F 21/6245 726/1 |
| 2012/0222083 A1 | 8/2012 | Vähä-Sipilä et al. | |
| 2013/0203440 A1 | 8/2013 | Bilange et al. | |
| 2013/0298248 A1* | 11/2013 | Boldrev | G06F 21/6245 726/26 |
| 2013/0339345 A1 | 12/2013 | Soto Matamala et al. | |
| 2014/0059695 A1* | 2/2014 | Parecki | G06F 21/60 726/26 |
| 2014/0073305 A1* | 3/2014 | Poulain | G06F 1/3287 455/418 |
| 2014/0157336 A1* | 6/2014 | Deegan | H04L 65/605 725/91 |
| 2015/0172858 A1* | 6/2015 | Choi | H04M 1/2745 455/456.1 |
| 2015/0180938 A1* | 6/2015 | Ruppin | H04L 67/06 726/30 |
| 2015/0281878 A1 | 10/2015 | Roundtree et al. | |
| 2016/0029212 A1 | 1/2016 | Brandt et al. | |
| 2016/0164972 A1* | 6/2016 | Collins | H04W 4/70 702/188 |
| 2016/0316332 A1* | 10/2016 | Bai | H04W 4/023 |
| 2017/0006430 A1* | 1/2017 | Chao | H04W 4/029 |
| 2018/0039855 A1* | 2/2018 | Kecskemeti | G06F 21/6254 |
| 2018/0139580 A1* | 5/2018 | Guha | H04W 4/023 |
| 2019/0007460 A1* | 1/2019 | Ruppin | G06F 16/178 |
| 2019/0108353 A1* | 4/2019 | Sadeh | G06F 21/604 |
| 2019/0174267 A1* | 6/2019 | Chao | H04W 4/029 |
| 2019/0297465 A1* | 9/2019 | Chao | G06Q 30/0271 |
| 2019/0340360 A1* | 11/2019 | Kulkarni | G06F 21/57 |

FOREIGN PATENT DOCUMENTS

| | | |
|---|---|---|
| CN | 104581625 A | 4/2015 |
| CN | 104780501 A | 7/2015 |
| CN | 105554699 A | 5/2016 |
| GN | 103202001 A | 7/2013 |
| GN | 103957520 A | 7/2014 |
| JP | 2013-205243 A | 10/2013 |

* cited by examiner

ELECTRONIC DEVICE AND METHOD FOR PROVIDING LOCATION DATA

CROSS-REFERENCE TO RELATED APPLICATION(S)

This application claims the benefit under 35 U.S.C. § 119(a) of a Korean patent application filed on Dec. 12, 2016 in the Korean Intellectual Property Office and assigned Serial number 10-2016-0168566, the entire disclosure of which is incorporated herein by reference.

TECHNICAL FIELD

The present disclosure relates to electronic devices and methods for providing location data.

BACKGROUND

Smartphone or other mobile devices are able to provide high portability and new diversified services using their various functions, such as networking or sensing. Recently, various services are available through sensors equipped in the smartphone.

A smartphone may gather location information through location sensors, such as a global positioning system (GPS) module, Wi-Fi module, cellular module, acceleration sensor, and a gyro sensor. When a location-based service (LBS) application runs on a smartphone, the smartphone may offer various LBSs through the running application using location information gathered.

The above information is presented as background information only to assist with an understanding of the present disclosure. No determination has been made, and no assertion is made, as to whether any of the above might be applicable as prior art with regard to the present disclosure.

SUMMARY

To more precisely provide a user with a service using a location-based service (LBS) application, the user's exact location data may be collected under his/her consent. In this case, the user, albeit able to obtain an exact service result, may be subjected to an invasion of privacy or leakage of personal information, which may then be used for malicious purposes.

Aspects of the present disclosure are to address at least the above-mentioned problems and/or disadvantages and to provide at least the advantages described below. Accordingly, an aspect of the present disclosure is to a method and apparatus for providing an electronic device and a method for alleviating the user's invasion of privacy or leakage of personal information regarding location information by adjusting the standards for providing the user's location information.

In accordance with another aspect of the present disclosure, an electronic device and method for providing location data is provided.

In accordance with another aspect of the present disclosure, an electronic device is provided. The electronic device includes a user interface, a location sensor configured to sense a location of the electronic device, a processor electrically connected with the user interface and the location sensor, and a memory electrically connected with the processor and configured to store a first application program and a second application program. The memory is further configured to store instructions that, when executed, enable the processor to receive first location data with a first degree of accuracy regarding the location of the electronic device from the location sensor, process at least part of the first location data to generate second location data with a second degree of accuracy lower than the first degree of accuracy regarding the location of the electronic device, provide the at least part of the first location data to execute the first application program, and provide at least part of the second location data to execute the second application program.

In accordance with another aspect of the present disclosure, an electronic device is provided. The electronic device includes a user interface, a location sensor configured to sense a location of the electronic device, a processor electrically connected with the user interface and the location sensor, and a memory electrically connected with the processor. The memory is configured to store instructions that, when executed, enable the processor to receive first location data regarding the location of the electronic device from the location sensor, obtain second location data corresponding to the first location data according to a designated condition, and provide at least part of the second location data to a first application that is executed on the electronic device.

In accordance with another aspect of the present disclosure, a non-transitory recording medium storing commands to execute a method for controlling an electronic device, the commands being configured to be executed by at least one processor to enable the at least one processor to perform at least one operation, is provided. The at least one operation includes receiving first location data with a first degree of accuracy regarding a location of the electronic device from a location sensor, processing at least part of the first location data to generate second location data with a second degree of accuracy lower than the first degree of accuracy regarding the location of the electronic device, providing the at least part of the first location data to execute a first application program, and providing at least part of the second location data to execute a second application program.

In accordance with another aspect of the present disclosure, a non-transitory recording medium storing commands to execute a method for controlling an electronic device, the commands being configured to be executed by at least one processor to enable the at least one processor to perform at least one operation, is provided. The at least one operation includes receiving first location data regarding a location of the electronic device from a location sensor, obtaining second location data corresponding to the first location data according to a designated condition, and providing at least part of the second location data to a first application that is executed on the electronic device.

In accordance with another aspect of the present disclosure, a method for operating an electronic device is provided. The method includes receiving first location data with a first degree of accuracy regarding a location of the electronic device from a location sensor, processing at least part of the first location data to generate second location data with a second degree of accuracy lower than the first degree of accuracy regarding the location of the electronic device, providing the at least part of the first location data to execute a first application program, and providing at least part of the second location data to execute a second application program.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
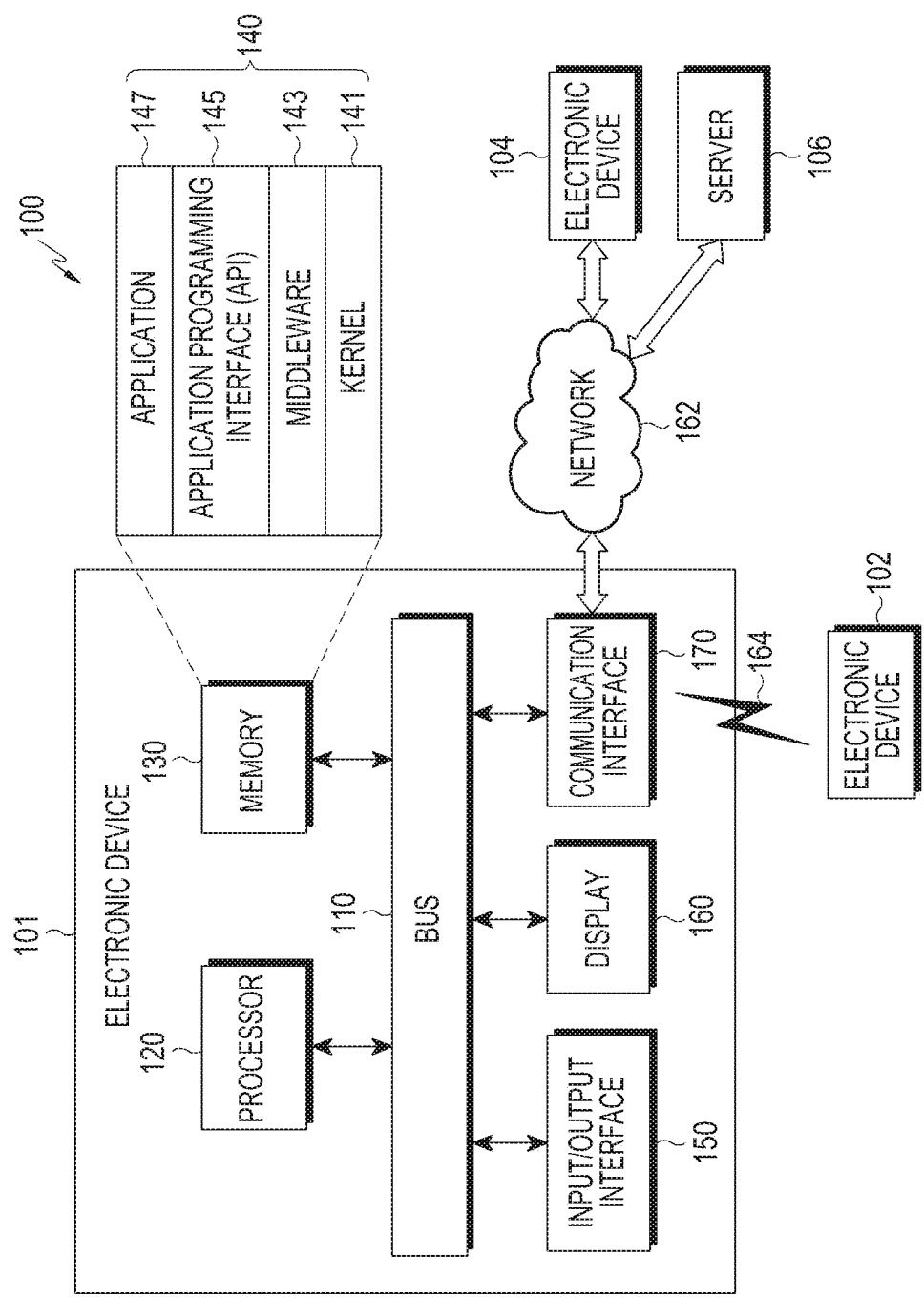
FIG. 1 illustrates a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural references unless the context clearly dictates otherwise. Thus, for example, reference to "a component surface" includes reference to one or more of such surfaces.

As used herein, the terms "A or B," "at least one of A and/or B," or "A/B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

For example, examples of the electronic device according to various embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a Moving Picture Experts Group (MPEG-1 or MPEG-2) audio layer-3 (MP3) player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to various embodiments of the present disclosure, the electronic device may be flexible or may be a combination of the above-enumerated electronic devices. According to an embodiment of the disclosure, the electronic devices are not limited to those described above. As used herein, the term "user" may denote a human or another device (e.g., an artificial intelligent electronic device) using the electronic device.

FIG. 1 illustrates a network environment including an electronic device according to an embodiment of the present disclosure.

Referring to FIG. 1, according to an embodiment of the present disclosure, an electronic device 101 is included in a network environment 100. The electronic device 101 may include a bus 110, a processor 120, a memory 130, an input/output interface 150, a display 160, and a communication interface 170. In some embodiments, the electronic device 101 may exclude at least one of the above components or may add another component.

The bus 110 may include a circuit for connecting the processor 120, the memory 130, the input/output interface 150, the display 160, and the communication interface 170 with one another and transferring communications (e.g., control messages or data) between the same.

The processor 120 may include one or more of a CPU, an AP, or a communication processor (CP). The processor 120 may perform control on at least one of the other components of the electronic device 101, and/or perform an operation or data processing relating to communication.

According to an embodiment of the present disclosure, the processor 120 may provide first location data with a first degree of accuracy regarding the location of the electronic device 101, process at least part of the first location data to generate second location data with a second degree of accuracy lower than the first degree of accuracy, and provide at least part of the first location data to a first application and at least part of the second location data to a second application.

According to an embodiment of the present disclosure, the first location data with the first degree of accuracy may include information about a first area, and the second location with the second degree of accuracy may include information about a second area larger than the first area. The first area may be included in the second area or may be located around the second area.

For example, the first location data with the first degree of accuracy is address information, e.g., "315 Linden St., San Francisco, Calif. 94102," the second location data with the second degree of accuracy may be address information, e.g., "San Francisco, Calif. 94102," which corresponds to a larger area than "315 Linden St."

The memory 130 may include a volatile and/or non-volatile memory. For example, the memory 130 may store commands or data related to at least one other component of the electronic device 101.

According to an embodiment of the present disclosure, the memory 130 may store software and/or a program 140. The program 140 may include, e.g., a kernel 141, middleware 143, an application programming interface (API) 145, an application program (or "application") 147, and/or a memory 149. At least a portion of the kernel 141, middleware 143, or API 145 may be denoted as an operating system (OS).

For example, the kernel 141 may control or manage system resources (e.g., the bus 110, the processor 120, or the memory 130) used to perform operations or functions implemented in other programs (e.g., the middleware 143, API 145, or application 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application 147 in an order of a priority. For example, the middleware 143 may assign a priority of using system resources (e.g., bus 110, processor 120, or memory 130) of the electronic device 101 to at least one of the application 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

According to an embodiment of the present disclosure, the memory 149 may gather location information of the electronic device 101, process the gathered location information into location data corresponding to a particular degree of accuracy, and provide the location data. For example, the location provision module 149 may gather location information, process the gathered location information into location data corresponding to a particular degree of accuracy, and provide the location data to at least one application.

The display 160 may include, e.g., a liquid crystal display (LCD), a light emitting diode (LED) display, an organic LED (OLED) display, a micro-electromechanical systems (MEMS) display, or an electronic paper display. The display 160 may display various contents (e.g., text, images, videos, icons, or symbols) to the user. The display 160 may include a touchscreen and may receive, e.g., a touch, gesture, proximity, drag, swipe, or hovering input using an electronic pen or a body part of the user.

For example, the communication interface 170 may set up communication between the electronic device 101 and an external device (e.g., a first external electronic device 102, a second external electronic device 104, or a server 106). For example, the communication interface 170 may be connected with a network 162 through wireless communication or wired communication and may communicate with an external device (e.g., the second external electronic device 104 or server 106).

The wireless communication may include cellular communication which uses at least one of, e.g., long term evolution (LTE), LTE-advanced (LTE-A), code division multiple access (CDMA), wideband CDMA (WCDMA), universal mobile telecommunication system (UMTS), wireless broadband (WiBro), or global system for mobile communication (GSM). According to an embodiment of the present disclosure, the wireless communication, as shown in an element 164 of FIG. 1, may include at least one of, e.g., Wi-Fi, LiFi, bluetooth (BT), BT low power (BLE), zigbee, near field communication (NFC), magnetic secure transmission (MST), radio frequency, or body area network (BAN). According to an embodiment of the present disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101.

According to an embodiment of the present disclosure, all or some of operations executed on the electronic device 101 may be executed on another or multiple other electronic devices (e.g., the first and second external electronic devices 102 and 104 or server 106).

According to an embodiment of the present disclosure, when the electronic device 101 should perform some function or service automatically or at a request, the electronic device 101, instead of executing the function or service on its own or additionally, may request another device (e.g., the first and second external electronic devices 102 and 104 or server 106) to perform at least some functions associated therewith. The other electronic device (e.g., the first and second external electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
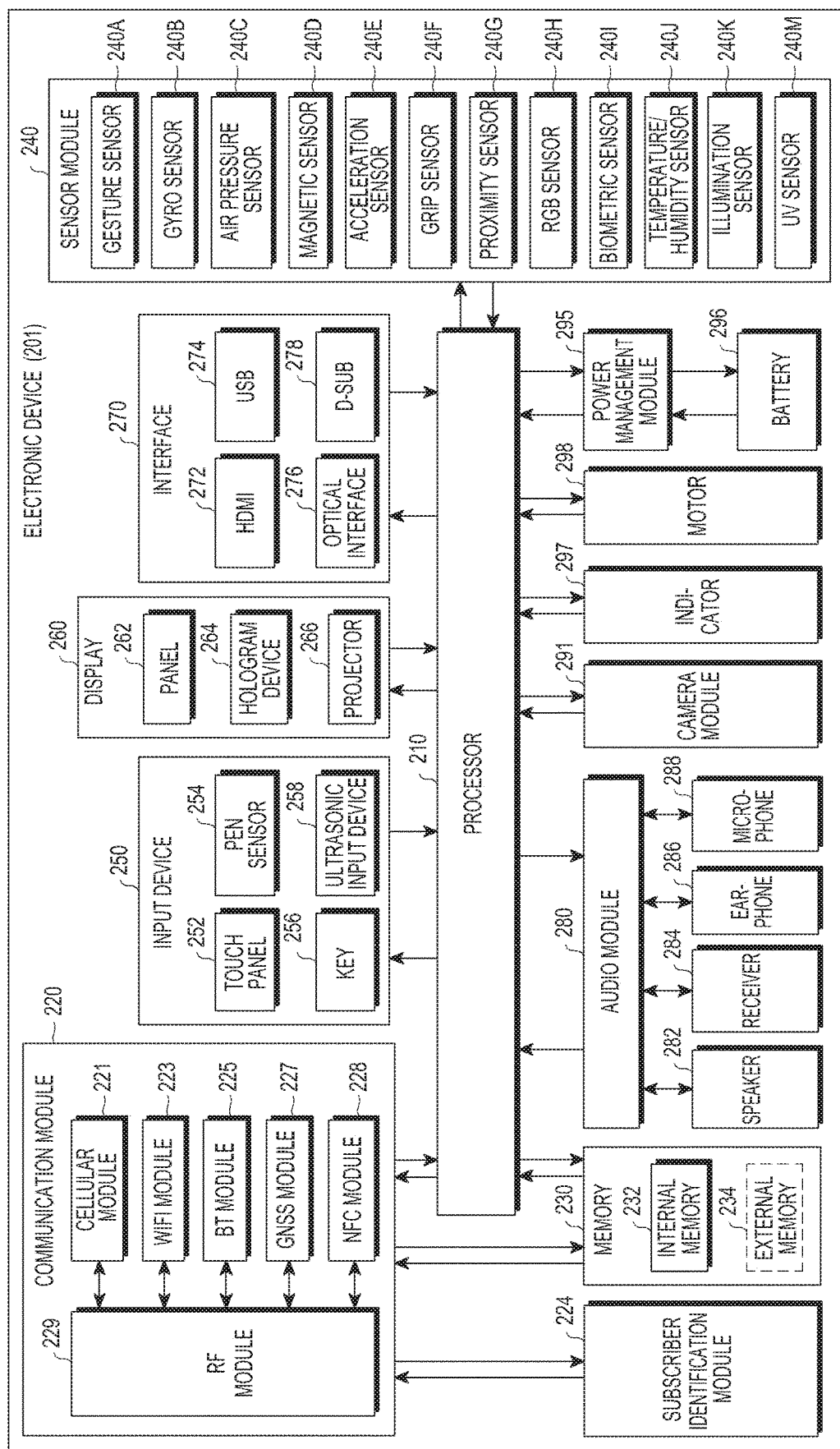
FIG. 2 is a block diagram illustrating an electronic device according to an embodiment of the present disclosure.

FIG. 2 is a block diagram illustrating an electronic device according to an embodiment of the present disclosure.

Referring to FIG. 2, an electronic device 201 may include the whole or part of the configuration of, e.g., the electronic device 101 shown in FIG. 2. The electronic device 201 may include one or more processors (e.g., APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an OS or application programs, and the processor 210 may process and compute various data. The processor 210 may be implemented in, e.g., a system on chip (SoC).

According to an embodiment of the present disclosure, the processor 210 may further include a graphic processing unit (GPU) and/or an image signal processor (ISP). The processor 210 may include at least some (e.g., cellular module 221) of the components shown in FIG. 2. The processor 210 may load a command or data received from at least one of other components (e.g., a non-volatile memory) on a volatile memory, process the command or data, and store resultant data in the non-volatile memory.

According to an embodiment of the present disclosure, the processor 210 may obtain first location data with a first degree of accuracy regarding the location of the electronic device 200 and process the generated first location data to generate second location data with a second degree of accuracy which is lower than the first degree of accuracy. The processor 210 may provide at least part of the first location data to a first application and at least part of the second location data to a second application.

According to an embodiment of the present disclosure, the processor 210 may obtain the first location data regarding the location of the electronic device 200, obtain the second location data corresponding to the first location data according to a designated condition, and provide at least part of the second location data to the first application that runs on the electronic device 200. For example, the designated condition may include information set about whether to provide the first application with the first location data or the second location data according to a user input.

The communication module 220 may have the same or similar configuration as the communication interface 170. The communication module 220 may include, e.g., a cellular module 221, a Wi-Fi module 223, a bluetooth (BT) module 225, a GNSS module 227, an NFC module 228, and an RF module 229. The cellular module 221 may provide voice call, video call, text, or Internet services through, e.g., a communication network. The cellular module 221 may perform identification or authentication on the electronic device 201 in the communication network using the SIM 224 (e.g., the SIM card). According to an embodiment of the present disclosure, the cellular module 221 may perform at least some of the functions providable by the processor 210. According to an embodiment of the present disclosure, the cellular module 221 may include a CP. According to an embodiment of the present disclosure, at least some (e.g., two or more) of the cellular module 221, the Wi-Fi module 223, the BT module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or at least one antenna. According to an embodiment of the present disclosure, at least one of the cellular module 221, the Wi-Fi module 223, the BT module 225, the GNSS module 227, or the NFC module 228 may communicate RF signals through a separate RF module. The SIM 224 may include, e.g., a card including a subscriber identification module, or an embedded SIM, and may contain unique identification information (e.g., an IC card identifier (IC-CID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic random access memory (DRAM), a static RAM (SRAM), a synchronous dynamic RAM (SDRAM), etc.) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM), a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a memory Stick™. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an air (atmospheric) pressure sensor 240C, a magnetic sensor 240D, an acceleration sensor 240E, a grip sensor 240F, a proximity sensor 240G, a color sensor 240H (e.g., a red-green-blue (RGB) sensor), a biometric sensor 240I, a temperature/humidity sensor 240J, an illumination sensor 240K, or an ultra violet (UV) sensor 240M. Additionally or alternatively, the sensor module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 201 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present disclosure, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 may include e.g., an HDMI 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, an SD card/MMC interface, or an IR data association (IrDA) standard interface.

The audio module 280 may convert, e.g., a sound signal, into an electrical signal and vice versa. At least a part of the audio module 280 may be included in, e.g., the input/output interface 150 as shown in FIG. 1. The audio module 280 may process sound information input or output through, e.g., a speaker 282, a receiver 284, an earphone 286, or a microphone 288.

For example, the camera module 291 may be a device for capturing still images and videos, and may include, according to an embodiment of the present disclosure, one or more image sensors (e.g., front and back sensors), a lens, an ISP, or a flash such as an LED or xenon lamp.

The power manager module 295 may manage power of the electronic device 201, for example. According to an embodiment of the present disclosure, the power manager module 295 may include a power management IC (PMIC), a charger IC, or a battery or fuel gauge. The PMIC may have a wired and/or wireless recharging scheme. The wireless charging scheme may include, e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including, e.g., a booting state, a message state, or recharging state. The motor 298 may convert an electric signal to a mechanical vibration and may generate a vibrational or haptic effect. The electronic device 201 may include a mobile television (TV) supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as the elements before being combined.

Figure 3:
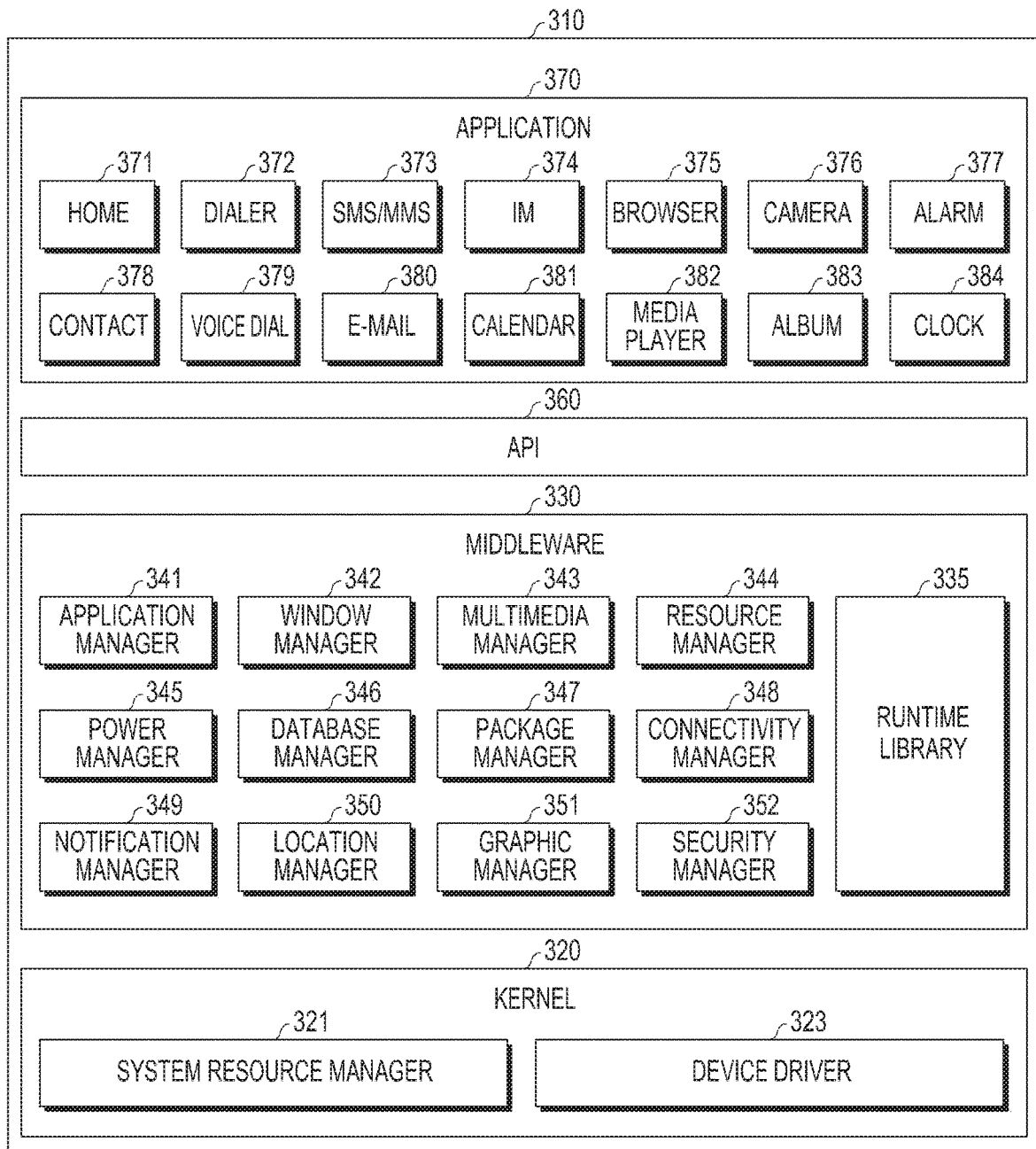
FIG. 3 is a block diagram illustrating a program module according to an embodiment of the present disclosure.

FIG. 3 is a block diagram illustrating a program module according to an embodiment of the present disclosure.

Referring to FIG. 3, according to an embodiment of the present disclosure, a program module 310 (e.g., the program 140) may include an OS controlling resources related to the electronic device (e.g., the electronic device 101) and/or various applications (e.g., the application 147) driven on the OS. The OS may include, e.g., Android™, iOS™, Windows™, Symbian™, Tizen™, or Bada™. The program module 310 may include a kernel 320 (e.g., the kernel 141), middleware 330 (e.g., the middleware 143), an API 360 (e.g., the API 145), an application 370 (e.g., the application 147), and/or a location provision module 380. At least a part of the program module 310 may be preloaded on the electronic device or may be downloaded from an external electronic device (e.g., the first and second external electronic devices 102 and 104 or server 106).

The kernel 320 may include, e.g., a system resource manager 321 or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a BT driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by application 370. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341 may manage the life cycle of, e.g., the application 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an embodiment of the present disclosure, the power manager 345 may interwork with a basic input/output system (BIOS). The database manager 346 may generate, search, or vary a database to be used in the application 370. The package manager 347 may manage an installation or an update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an embodiment of the present disclosure, the middleware 330 may include a telephony manager for managing the voice or video call function of the electronic device or a middleware module able to form a combination of the functions of the above-described elements. According to an embodiment of the present disclosure, the middleware 330 may provide a module specified according to the type of the OS. The middleware 330 may dynamically omit some existing components or add new components. The API 360 may be a set of, e.g., API programming functions, and may have different configurations depending on the OS. For example, in the case of Android™ or iOS™ one API set may be provided per platform, and in the case of Tizen™ two or more API sets may be offered per platform.

The application 370 may include an application that may provide, e.g., a home 371, a dialer 372, a short message service (SMS)/multimedia messaging service (MIMS) 373, an instant message (IM) 374, a browser 375, a camera 376, an alarm 377, a contact 378, a voice dial 379, an e-mail 380, a calendar 381, a media player 382, an album 383, or a clock 384, a health-care (e.g., measuring the degree of workout or blood sugar), or provision of environmental information (e.g., provision of air pressure, moisture, or temperature information). According to an embodiment of the present disclosure, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by another application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present disclosure, the application 370 may include an application (e.g., a health-care application of a mobile medical device) designated according to an attribute of the external electronic device. According to an embodiment of the present disclosure, the application 370 may include an application received from the external electronic device.

At least a portion of the program module 310 may be implemented (e.g., executed) in software, firmware, hardware (e.g., the processor 210), or a combination of at least two or more thereof and may include a module, program, routine, command set, or process for performing one or more functions.

Figure 4:
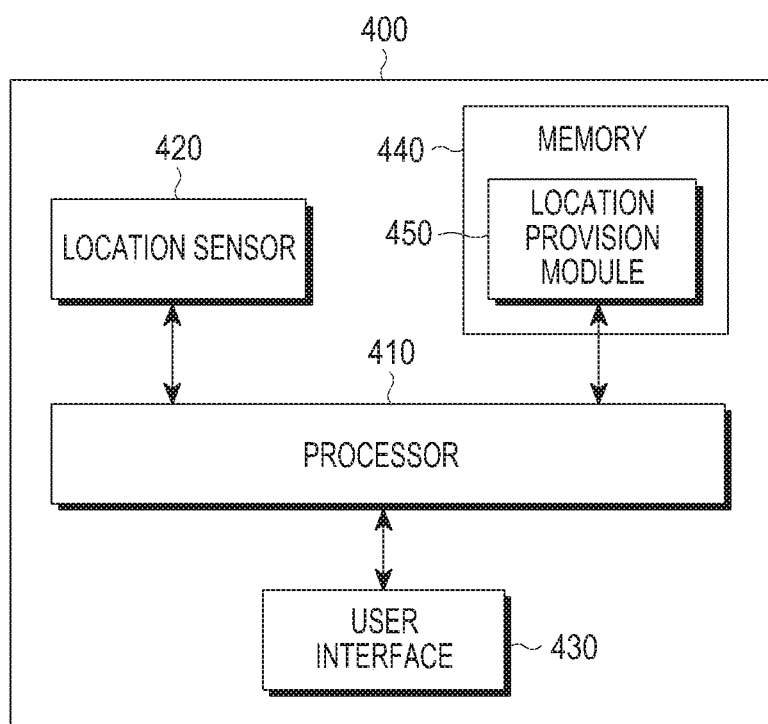
FIG. 4 is a view illustrating a configuration of an electronic device according to an embodiment of the present disclosure.

FIG. 4 is a view illustrating a configuration of an electronic device according to an embodiment of the present disclosure.

Referring to FIG. 4, an electronic device 400 may include a processor 410, a location sensor 420, a user interface 430, and a memory 440. According to an embodiment of the present disclosure, the memory 440 may include a location provision module 450. According to an embodiment of the present disclosure, the location provision module 450 may include instructions (e.g., a platform or framework) executed by the processor 410 and may gather, process, and provide location information.

According to an embodiment of the present disclosure, the processor 410 may obtain first location data regarding the location of the electronic device 400 sensed through the location sensor 420. For example, the processor 410 may store, in the memory 440, the first location data including GPS information, Wi-Fi information, BT information, cellular information, acceleration information, or direction information of the electronic device 400 which is obtained through the location sensor 420. The first location data may be raw data having a first degree of accuracy regarding the location of the electronic device 400.

According to an embodiment of the present disclosure, the processor 410 may execute the location provision module 450 to process at least part of the first location data, generating second location data having a second degree of accuracy which is lower than the first degree of accuracy. For example, the second location data may include only information (e.g., area information) covering a full address for the location of the electronic device 400. According to an embodiment of the present disclosure, the second location data may include an address corresponding to an area that is broader than the location of the electronic device 400.

The processor 410 may provide at least part of the first location data to a first application program and at least part of the second location data to a second application program through the location provision module 450.

According to an embodiment of the present disclosure, the processor 410 may provide a location-based service using the first location data or the second location data according to various standards for determining the degree of accuracy. For example, the standards for determining the degree of accuracy may include at least one of accuracy determination data including various data about the electronic device 400 and user configuration data set by a user input. The processor 410 may receive a user input (e.g., a touch input) through the user interface 430.

According to an embodiment of the present disclosure, the processor 410 may provide a location-based service using the first location data or the second location data based on the accuracy determination data. For example, the accuracy determination data may include at least one of location data, schedule data, time data, context data, and application use data.

According to an embodiment of the present disclosure, the processor 410 may analyze the gathered first location data (or information) and determine whether the analyzed first location data corresponds to a first location (or a first area) or a second location (or a second area).

According to an embodiment of the present disclosure, the first location may be a location where the first location data may be provided, and the second location may be a location where the second location data may be provided.

According to an embodiment of the present disclosure, the first location may be a location where details of the user's location data may be published (or the details are set to be published), and the second location may be a location where the details of the user's location data are not desired to be published (or the details are set not to be published).

According to an embodiment of the present disclosure, the first location may include, e.g., a location corresponding to a personal schedule set by the user, the location of a place set to a home by the user, or the location of a place where the user is determined to relax, and the second location may include, e.g., a location corresponding to a company schedule set by the user, the location of a place set to a company by the user, or the location of a place where the user is determined to be on duty.

According to an embodiment of the present disclosure, the first location or the second location is not limited to the above-described locations. Depending on the user's settings, the processor 410 may determine that the location of the place set to the home by the user is the second location or that the location of the place set to the company by the user is the first location.

When the analyzed first location data is determined to correspond to the first location, the processor 410 may provide part of the gathered first location data. For example, the first location data with the first degree of accuracy may include a country name (e.g., Korea, China, the U.S.A., or Japan), a city or province name (e.g., Seoul), a district name (e.g., Jongro-gu), a neighborhood name (e.g., Hyehwa-dong), a street name (e.g., Daemyeong-geori), a building name (e.g., Mihwa-building), and a house number (e.g., 315-beonji).

When the analyzed first location data is determined to correspond to the second location, the processor 410 may process at least part of the gathered first location data and provide second location data with a second degree of accuracy that is lower than the first degree of accuracy. For example, the second location data with the second degree of accuracy may include location data (e.g., at least one of a city/province name or a country name) of an area larger than the location of the electronic device 400.

According to an embodiment of the present disclosure, the processor 410 may further gather various device data (e.g., time data, schedule data, context data, degree of use of application, etc.) as well as the location data of the electronic device 400 and may provide the first location data with the first degree of accuracy or the second location data with the second degree of accuracy based on the gathered location data and device data.

According to an embodiment of the present disclosure, the processor 410 may determine whether the gathered time data corresponds to a first time or a second time.

According to an embodiment of the present disclosure, the first time may be a time when the first location data may be provided, and the second time may be a time when the second location data may be provided.

According to an embodiment of the present disclosure, the first time may be a time when details of the user's location may be published (or the details are set to be published), and the second time may be a time when the details of the user's location are not desired to be published (or the details are set not to be published).

For example, the first time may include a time set by the user to have a personal schedule, a time when the user stays (or is positioned) at home, or a time when the user is determined to relax, and the second time may include a time set by the user to have a company schedule, a time when the user stays at work, or a time when the user is determined to be on duty.

According to an embodiment of the present disclosure, the first time or the second time is not limited to the above-described times. Depending on the user's settings, the processor 410 may determine that the time when the user stays at home is the second time or that the time when the user stays at work is the first time.

Upon determining that the gathered time data corresponds to the first time, the processor 410 may provide the first location data with the first degree of accuracy which is received from the location sensor 420. For example, where the user stays at work during a morning time and stays at home during an afternoon time, the processor 410 may determine that the morning time when he/she stays at work corresponds to the first time and that the afternoon time when he/she stays at home corresponds to the second time. Where the analyzed time data is the morning time, the processor 410 may provide the first location data (e.g., the detailed address of the company) corresponding to the morning time.

Upon determining that the gathered time data corresponds to the second time, the processor 410 may provide the second location data with the second degree of accuracy which is lower than the first degree of accuracy. For example, where the gathered time data is the afternoon time, the processor 410 may generate and provide the second location data (e.g., the name of an area larger than the location of the home) with a lower degree of accuracy than the first location data (e.g., the detailed address of the home).

According to an embodiment of the present disclosure, the processor 410 may determine whether the gathered schedule data corresponds to a first schedule or a second schedule.

According to an embodiment of the present disclosure, the first schedule may be a schedule where the first location data may be provided, and the second schedule may be a schedule where the second location data may be provided.

According to an embodiment of the present disclosure, the first schedule may be a schedule where details of the user's location may be published (or the details are set to be published), and the second schedule may be a schedule where the details of the user's location are not desired to be published (or the details are set not to be published).

For example, the first schedule may include a schedule set by the user at home, a schedule related to a vacation, or a schedule with a family member or friend, and the second schedule may include a schedule set by the user at work, a schedule related to a meeting or business trip, or a schedule with work-related people.

According to an embodiment of the present disclosure, the first schedule or the second schedule is not limited to the above-described schedules. Depending on the user's settings, the processor 410 may determine that the vacation-related schedule is the second schedule or the schedule related to the meeting or business trip is the first schedule.

Upon determining that the gathered schedule data corresponds to the first schedule, the processor 410 may provide the first location data received from the location sensor 420. For example, the processor 410 may determine that a business-related schedule, e.g., meeting or business trip, corresponds to the first schedule and that a personal schedule, e.g., vacation, corresponds to the second schedule. Where the analyzed schedule data is determined to be a business-related schedule, the processor 410 may provide the first location data (e.g., the detailed address for the place of the meeting or business trip) corresponding to the business-related schedule.

Where the gathered schedule data is determined to be a personal schedule, the processor 410 may generate and provide the second location data (e.g., the name of an area larger than the location of the home or place of appointment) which is lower in degree of accuracy than the first location data (e.g., the detailed address of the location of the home or place of appointment) corresponding to the personal schedule.

According to an embodiment of the present disclosure, the processor 410 may provide the first location data or second location data depending on whether there is schedule data. For example, when schedule data is present on a particular date, the processor 410 may provide the second location data to an application that requests to provide location data on the particular date, and when no schedule data is present on the particular date, the processor 410 may provide the first location data to the application that requests to provide location data on the particular date.

According to an embodiment of the present disclosure, the processor 410 may determine whether the gathered context data corresponds to a first status or a second status. The status may be the user's current status, e.g., the user is currently having a meal, traveling, driving, working out, or relaxing.

According to an embodiment of the present disclosure, the first status may be a status where the first location data may be provided, and the second status may be a status where the second location data may be provided.

According to an embodiment of the present disclosure, the first status may be a status where details of the user's location data may be published (or the details are set to be published), and the second status may be a status where the details of the user's location data are not desired to be published (or the details are set not to be published).

For example, the first status may include relaxing, traveling, walking, or eating, and the second status may include working, on a business trip, in a meeting, or driving.

According to an embodiment of the present disclosure, the first status or the second status is not limited to the above-described statuses. Depending on the user's settings, the processor 410 may determine that relaxing is the second status or working is the first status.

Upon determining that the gathered context data corresponds to the first status, the processor 410 may provide the first location data with the first degree of accuracy which is received from the location sensor 420. For example, where the user is determined to be walking, the processor 410 may determine that it corresponds to the first status, and where the user is determined to be driving, the processor 410 may determine that it corresponds to the second status.

Where the gathered context data is determined to be walking, the processor 410 may provide the first location data (e.g., the detailed address for the current location of the electronic device 400) corresponding to the walking. For example, where the location of the user is "Sageori, Seocho-dong," the processor 410 may control the location provision module 450 to provide the detailed address, e.g., "Sageori, Seocho-dong, Gangnam-gu, Seoul," as the first location data.

Upon determining that the gathered context data corresponds to the second status, the processor 410 may provide the second location data with the second degree of accuracy which is lower than the first degree of accuracy. For example, where the gathered context data is determined to be the driving, the processor 410 may generate and provide the second location data (e.g., the name of an area larger than the current location of a vehicle) that is lower in degree of accuracy than the first location data (e.g., the detailed address of the current location of the vehicle) corresponding to the driving. Where the location of the vehicle is "Sageo-ri, Nonhyeon-dong," the processor 410 may provide "Nonhyeon-dong," which is the name of the area larger than that of the detailed address, as the second location data.

According to an embodiment of the present disclosure, the processor 410 may analyze the gathered application use data to determine whether it corresponds to an application of interest which the user frequently uses or an application of no interest which the user infrequently uses.

According to an embodiment of the present disclosure, the application of interest may be a first application where the first location data may be provided, and the application of no interest may be a second application where the second location data may be provided.

According to an embodiment of the present disclosure, the application of interest may be an application that may publish (or be set to publish) details of the user's location, and the application of no interest may be an application that is not desired to publish (or is set not to publish) the details of the user's location.

For example, the application of interest (e.g., the first application) may include an application providing a map service, an application providing a navigation service, an application providing information about must-eat restaurants, and the application of no interest (e.g., the second application) may include a flashlight application, an application providing a coupon service, and a game-related application.

According to an embodiment of the present disclosure, the application of interest or the application of no interest is not limited to the above-enumerated applications. Depending on the user's settings, the processor 410 may determine that the application providing information about must-eat restaurants is the application of no interest or that the application providing a coupon service is the application of interest.

According to an embodiment of the present disclosure, a plurality of applications providing similar services (e.g., applications providing information about must-eat restaurants) may also provide the first location data or second location data depending on the user's settings.

Upon receiving a request for providing location data from the first application which is determined to be the application of interest based on the analyzed application use data, the processor 410 may provide the first location data with the first degree of accuracy which is received from the location sensor 420. For example, upon receipt of a request to provide location data from an application providing data about must-eat restaurants which is determined to be the application of interest, the processor 410 may provide the first location data (e.g., the detailed address of the current location of the electronic device 400).

Upon receipt of a request to provide location data from the second application determined to be the application of no interest, the processor 410 may generate and provide the second location data with the second degree of accuracy which is lower than the first degree of accuracy. For example, upon receipt of a request to provide location data from an application providing coupon data which is determined to be the application of no interest, the processor 410 may generate and provide the second location data (e.g., the name of an area larger than the current location of the electronic device 400) which is lower in degree of accuracy than the first location data (e.g., the detailed address of the current location of the electronic device 400).

According to an embodiment of the present disclosure, the processor 410 may provide the first location data or second location data based on user configuration data set by a user input. For example, based on a user input received through the user interface 430, the processor 410 may make settings to provide the detailed address (e.g., the first location data) for the location of the electronic device 400 to the first application and to provide the name (e.g., the second location data) of an area larger than the location of the electronic device 400 to the second application. Or, based on a user input received through the user interface 430, the processor 410 may make settings to provide the name (e.g., Hyehwa-dong) of an area larger than the current location when the location of the electronic device 400 is the user's home and the detailed address for the current location when the location of the electronic device 400 is the office.

According to an embodiment of the present disclosure, the processor 410 may process the first location data using at least one of map coordinate data, such as the latitude or longitude, address data, point-of-interest (POI) data, user intimacy data, and past location data to generate and provide the second location data with the second degree of accuracy which is lower than the first degree of accuracy.

According to an embodiment of the present disclosure, the processor 410 may generate and provide the second location data with the second degree of accuracy which is lower than the first degree of accuracy based on the map coordinate data. For example, the processor 410 may provide coordinates (e.g., (37.776, −122.423) obtained by deleting (or excluding) the fourth and subsequent decimal places from the latitude-longitude coordinates (e.g., (37.776259, −122.423112)) corresponding to the current location of the electronic device 400.

According to an embodiment of the present disclosure, the processor 410 may generate and provide the second location data with the second degree of accuracy which is lower than the first degree of accuracy based on the address data. For example, the processor 410 may provide the address (e.g., San Francisco, Calif.) of an area larger than the current location of the electronic device 400.

According to an embodiment of the present disclosure, the processor 410 may generate and provide the second location data with the second degree of accuracy which is lower than the first degree of accuracy based on the POI data. For example, the processor 410 may convert the latitude-longitude coordinates (e.g., (37.776259, −122.423112) corresponding to the current location of the electronic device 400 into the POI (e.g., a blue bootle bay area) of an area larger than the current location of the electronic device 400 and provide the converted POI.

According to an embodiment of the present disclosure, the processor 410 may generate and provide the second location data with the second degree of accuracy which is lower than the first degree of accuracy based on the user intimacy data. The processor 410 may set a degree of intimacy for a particular location according to the number of the user's visits and provide the set degree of intimacy. For example, where the number of the user's visits to a first location is less than a preset first threshold, the processor 410 may set the degree of intimacy for the first location to a "low" and provide a set value, "low intimacy." Where the number of the user's visits to a second location is not less than a preset second threshold, the processor 410 may set the degree of intimacy for the second location to a "high" and provide a set value, "high intimacy."

According to an embodiment of the present disclosure, the processor 410 may convert the degree of intimacy for the particular place into a numerical value and provide the numerical value of intimacy data (e.g., Intimacy: 1).

According to an embodiment of the present disclosure, the processor 410 may generate and provide the second location data with the second degree of accuracy which is lower than the first degree of accuracy based on the past location data. The processor 410 may provide location data about a place where the electronic device 400 was located in the past, rather than the current location of the electronic device 400. For example, the processor 410 may collect a history for the user's locations, store the history in the memory 440, detect the location of the electronic device 400 one hour before the current time from the stored location history, and provide the address for the detected location or the name of an area larger than the detected location.

According to an embodiment of the present disclosure, the processor 410 may generate and provide the second location data with the second degree of accuracy which is lower than the first degree of accuracy based on a geohash algorithm that splits a space in a grid pattern. The processor 410 may convert the address or latitude-longitude coordinates corresponding to an area larger than the current location of the electronic device 400 into geohash coordinates using the geohash algorithm and provide the converted geohash coordinates.

According to an embodiment of the present disclosure, the processor 410, which may be a hardware module or software module (e.g., an application program), may be a hardware component (function) or software component (program) including at least one of various sensors, a data measuring module, an input/output interface, a module for managing the state or environment of the electronic device, or a communication module as included in the electronic device.

According to an embodiment of the present disclosure, the processor 410 may be at least a portion of the processor and may include a combination of one or more of, e.g., hardware, software, or firmware. According to an embodiment of the present disclosure, the processor 410 may lack at least some of the components or may include other components for performing an image processing operation in addition to the components.

According to an embodiment of the present disclosure, when implemented in hardware, the configuration of at least a portion of the processor 410 may include some of at least one processor including a CPU/micro processing unit (MPU), a memory (e.g., a register and/or RAM) where at least one piece of memory loading data is loaded, and a bus for inputting/outputting at least one piece of data to the processor and memory. When implemented in software, the processor 410 may include a predetermined program routine or program data that is loaded from a predetermined recording medium to a memory to perform a defined function on the electronic device and is processed by the processor.

According to an embodiment of the present disclosure, the location sensor 420 may sense the user's location and transfer the location data about the sensed location to the processor 410, the memory 440, or the location provision module 450. For example, the location sensor 420 may include at least one of a GPS module, a Wi-Fi module, a cellular module, an acceleration sensor, and a gyro sensor for sensing the user's location.

According to an embodiment of the present disclosure, the user interface 430 may display an execution screen for an application that provides a location-based service.

According to an embodiment of the present disclosure, the user interface 430 may receive user inputs (e.g., touch inputs).

According to an embodiment of the present disclosure, the memory 440 may store data that is used for adjusting the degree of accuracy for the user's location data. For example, the memory 440 may include the location provision module 450 for gathering the user's location data, adjusting the degree of accuracy of the gathered location data, and providing the accuracy-adjusted location data.

According to an embodiment of the present disclosure, the location provision module 450 may be executed by the processor 410 to gather the first location data with the first degree of accuracy which is received from the location sensor 420. The location provision module 450 may process at least part of the gathered first location data and generate second location data having a second degree of accuracy which is lower than the first degree of accuracy. The location provision module 450 may provide the first location data for executing the first application and the second location data for executing the second application.

According to an embodiment of the present disclosure, the location provision module 450 may be implemented as a software-type platform or framework.

According to an embodiment of the present disclosure, the location provision module 450, when executed by the processor 410, may gather the first location data regarding the location of the electronic device 400 and determine whether to provide the first location data or the second location data based on accuracy determination data. For example, the location provision module 450 may determine the location, time, schedule, status, and application where the user may, or does not desire to, publish based on the accuracy determination data including at least one of location data, time data, schedule data, context data, and application use data.

According to an embodiment of the present disclosure, the location provision module 450 may determine whether to provide the first location data or the second location data based on user configuration data set by a user input. For example, where the current location of the electronic device 400 corresponds to the first location where it has been set to be published, the location provision module 450 may provide the detailed address (e.g., the first location data) for the current location of the electronic device 400. Where the current location of the electronic device 400 corresponds to the second location where it has been set not to be published, the location provision module 450 may provide the name (e.g., the second location data) of an area larger than the current location of the electronic device 400.

According to an embodiment of the present disclosure, the location provision module may use at least one of map coordinate data, such as the latitude or longitude, address data, POI data, use intimacy data, and past location data to generate the second location data with the second degree of accuracy which is lower than the first degree of accuracy.

According to an embodiment of the present disclosure, the location provision module 450 may provide coordinates (e.g., (37.776, −122.423) obtained by deleting (or excluding) the fourth and subsequent decimal places from the latitude-longitude coordinates (e.g., (37.776259, −122.423112)) corresponding to the current location of the electronic device 400.

According to an embodiment of the present disclosure, the location provision module 450 may store or provide the name (e.g., San Francisco, Calif.) of an area larger than the detailed address (e.g., 315 Linden Street San Francisco, Calif. 94102) corresponding to the current location of the electronic device 400.

According to an embodiment of the present disclosure, the location provision module 450 may store or provide a value obtained by converting the latitude-longitude coordinates (e.g., (37.776259, −122.423112) corresponding to the current location of the electronic device 400 into the POI (e.g., a blue bottle bay area) of an area larger than the current location of the electronic device 400.

According to an embodiment of the present disclosure, the location provision module 450 may store or provide a value (e.g., Intimacy: 1) obtained by determining the user's degree of intimacy for the current location of the electronic device 400 and converting the determined degree of intimacy into a numerical value.

According to an embodiment of the present disclosure, the location provision module 450 may store or provide the detailed address for the place where the electronic device 400 was located one hour ago or the name of an area larger than the place where the electronic device 400 was located one hour ago.

According to an embodiment of the present disclosure, the location provision module 450 may convert the address or latitude-longitude coordinates corresponding to an area larger than the current location of the electronic device 400 into geohash coordinates using the geohash algorithm and store or provide the converted geohash coordinates.

Figure 5:
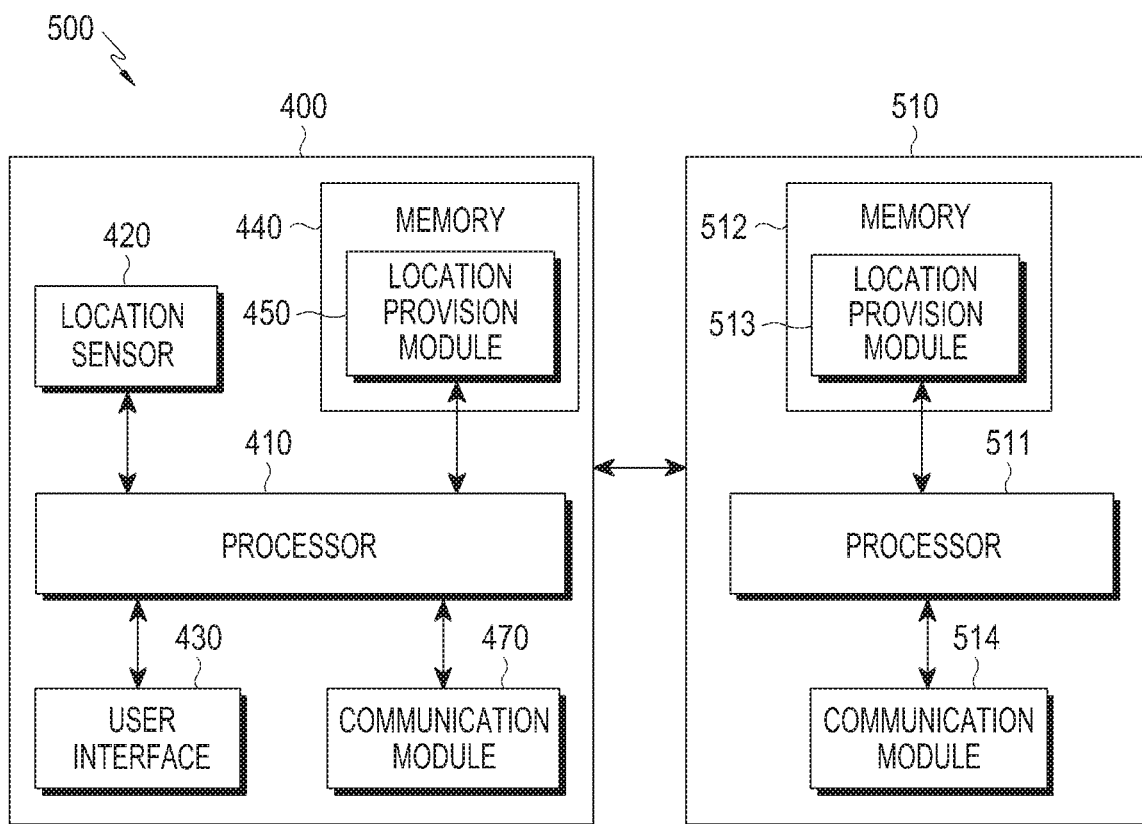
FIG. 5 is a view illustrating a configuration of an electronic device according to an embodiment of the present disclosure.

FIG. 5 is a view illustrating a configuration of a system according to an embodiment of the present disclosure.

Referring to FIG. 5, a system 500 may include an electronic device and a server.

According to an embodiment of the present disclosure, the electronic device 400 may include a processor 410, the location sensor 420, the user interface 430, the memory 440, the location provision module 450, and a communication module 470, as described above in connection with FIG. 4. The components may basically perform similar operations to those of the components of FIG. 4.

According to an embodiment of the present disclosure, the processor 410 may receive user configuration data set by a user input from a server 510 to provide first location data with a first degree of accuracy or to process the first location data to generate second location data with a second degree of accuracy which is lower than the first degree of accuracy. The processor 410 may transmit a request for accuracy determination information to the server 510 and receive accuracy determination information from the server 510 in response.

Upon receiving the user configuration data from the server 510, the processor 410 may provide the first location data with the first degree of accuracy or process the first location data to generate and provide the second location data with the second degree of accuracy which is lower than the first degree of accuracy using the user configuration data through the location provision module 450.

According to an embodiment of the present disclosure, the communication module 470 may communicate with the server 510. For example, the communication module 470 may include a USB module, a Wi-Fi module, a BT module, an NFC module, a GPS module, or a cellular communication module.

According to an embodiment of the present disclosure, the server 510 may include a processor 511, a memory 512, and a communication module 514. The memory 512 may include a location provision module 513.

According to an embodiment of the present disclosure, the processor 511 may receive first location data for a plurality of electronic devices from the plurality of electronic devices and store the first location data in the memory 512. For example, the first location data may be raw data with a first degree of accuracy related to the location of the plurality of electronic devices.

According to an embodiment of the present disclosure, the processor 511 may receive various device data (e.g., time data, schedule data, context data, or degree of use of application), as well as the location data, from the plurality of electronic devices and store the received data in the memory 512.

According to an embodiment of the present disclosure, the processor 511 may receive and store user configuration data set by a user input from the plurality of electronic devices. The processor 511 may produce a statistical value for the stored user configuration data and generate user configuration data preferred by the users of the plurality of electronic devices based on the produced statistical value. The processor 511 may transfer the preferred user configuration data generated to the electronic device 400.

For example, where a preset threshold number of users or more are determined, based on the produced statistical value, to provide the detailed address for the current location of the electronic device 400 during a morning time and provide the name of an area larger than the current location of the electronic device 400 during an afternoon time, the processor 511 may transfer user configuration data to the electronic device 400 to make settings to provide the detailed address during the morning time and the name of the area during the afternoon time.

According to an embodiment of the present disclosure, the processor 511 may transfer the first location data through the communication module 514 to at least one electronic device. Alternatively, the processor 511 may process the first location data through the location provision module 513 to generate the second location data with the second degree of accuracy, which is lower than the first degree of accuracy, and transfer the generated second location data through the communication module 514 to at least one electronic device. According to an embodiment of the present disclosure, the memory 512 may store data used to adjust the degree of accuracy of location data. For example, the memory 512 may store, e.g., the first location data for the plurality of electronic devices, device data, and an accuracy determination standard.

According to an embodiment of the present disclosure, the location provision module 513 may be executed by the processor 511 to process at least part of the first location data according to the accuracy determination standard, generating the second location data.

According to an embodiment of the present disclosure, the communication module 514 may communicate with the electronic device 400. For example, the communication module 514 may include a USB module, a Wi-Fi module, a BT module, an NFC module, a GPS module, or a cellular communication module.

Figure 6A:
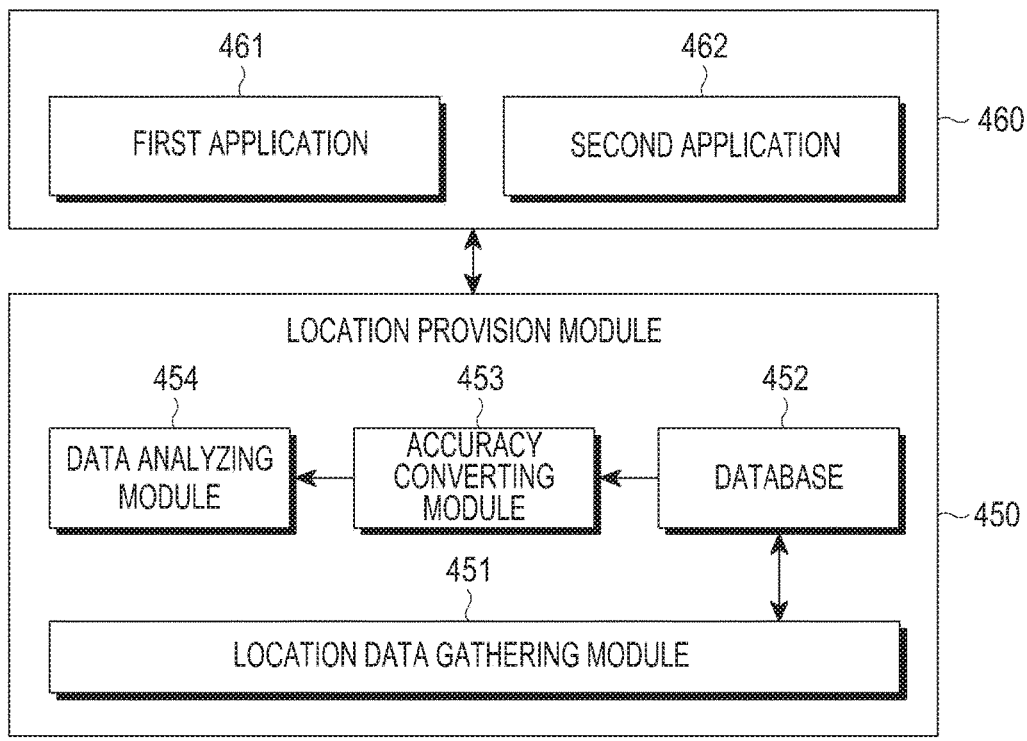
FIGS. 6A and 6B are views illustrating configurations of memories according to various embodiments of the present disclosure.
Figure 6B:
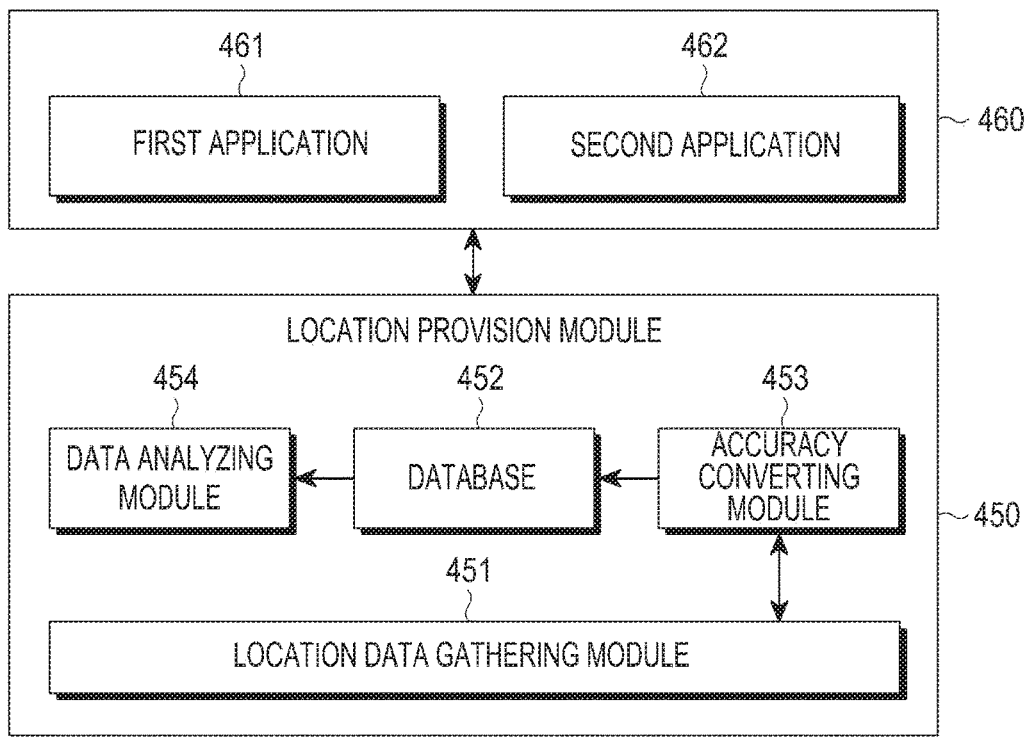

FIGS. 6A and 6B are views illustrating configurations of memories according to various embodiments of the present disclosure.

Referring to FIG. 6A, the memory 440 may include the location provision module 450 and an application program 460.

According to an embodiment of the present disclosure, the location provision module 450 may include a location data gathering module 451, a database 452, an accuracy converting module 453, and a data analyzing module 454.

According to an embodiment of the present disclosure, the location data gathering module 451 may gather first location data for various locations of the electronic device 400 received from the location sensor 420 and store the gathered first location data in the database 452.

According to an embodiment of the present disclosure, the location data gathering module 451 may further gather device data, such as time data, schedule data, context data, or application use data, as well as the location data and store the gathered device data in the database 452.

According to an embodiment of the present disclosure, the database 452 may store the first location data of the electronic device 400 gathered by the location data gathering module 451. For example, the first location data may include raw data for the plurality of locations for the electronic device 400.

According to an embodiment of the present disclosure, the database 452 may store the device data, such as time data, schedule data, context data, or application use data, gathered by the location data gathering module 451, as well as the first location data.

According to an embodiment of the present disclosure, upon receipt of a request signal from the data analyzing module 454, the accuracy converting module 453 may generate second location data with a second degree of accuracy which is lower than the first degree of accuracy according to the accuracy determination standard. The accuracy determination standard may include accuracy determination data or user configuration data.

According to an embodiment of the present disclosure, the accuracy converting module 453 may generate the second location data with the second degree of accuracy which is lower than the first degree of accuracy of the first location data based on the accuracy determination data (e.g., at least one of the first location data gathered by the location data gathering module 451, time data, schedule data, context data, and application use data).

According to an embodiment of the present disclosure, the accuracy converting module 453 may analyze the first location data of the electronic device 400 to determine whether the current location of the electronic device 400 corresponds to a first location where the first location data may be provided or a second location where the second location data may be provided. For example, where the first location data corresponds to the first location, the accuracy converting module 453 may transfer the first location data to the data analyzing module 454. Where the first location data corresponds to the second location, the accuracy converting module 453 may process the first location data to generate the second location data with the second degree of accuracy, and the accuracy converting module 453 may transfer the generated second location data to the data analyzing module 454.

According to an embodiment of the present disclosure, the accuracy converting module 453 may analyze the gathered time data to determine whether the current time of the electronic device 400 corresponds to a first time when the first location data may be provided or a second time when the second location data may be provided. For example, where the time data corresponds to the first time, the accuracy converting module 453 may transfer the first location data to the data analyzing module 454. Where the time data corresponds to the second time, the accuracy converting module 453 may process the first location data to generate the second location data with the second degree of accuracy, and the accuracy converting module 453 may transfer the generated second location data to the data analyzing module 454.

According to an embodiment of the present disclosure, the accuracy converting module 453 may analyze the gathered schedule data to determine whether the current schedule of the electronic device 400 corresponds to a first schedule when the first location data may be provided or a second schedule when the second location data may be provided. For example, where the schedule data corresponds to the first schedule, the accuracy converting module 453 may transfer the first location data to the data analyzing module 454. Where the schedule data corresponds to the second schedule, the accuracy converting module 453 may process the first location data to generate the second location data with the second degree of accuracy, and the accuracy converting module 453 may transfer the generated second location data to the data analyzing module 454.

According to an embodiment of the present disclosure, the accuracy converting module 453 may analyze the gathered context data to determine whether the current status of the electronic device 400 corresponds to a first status when the first location data may be provided or a second status when the second location data may be provided. For example, where the context data corresponds to the first status, the accuracy converting module 453 may transfer the first location data to the data analyzing module 454. Where the context data corresponds to the second status, the accuracy converting module 453 may process the first location data to generate the second location data with the second degree of accuracy, and the accuracy converting module 453 may transfer the generated second location data to the data analyzing module 454.

According to an embodiment of the present disclosure, the accuracy converting module 453 may analyze the gathered application use data to determine whether at least one application running on the electronic device 400 corresponds to a first application 461 (e.g., an application of interest) able to provide the first location data or a second application 462 (e.g., an application of no interest) able to provide the second location data. For example, where the application use data corresponds to the first application 461, the accuracy converting module 453 may transfer the first location data to the data analyzing module 454. Where the application use data corresponds to the second application 462, the accuracy converting module 453 may process the first location data to generate the second location data with the second degree of accuracy, and the accuracy converting module 453 may transfer the generated second location data to the data analyzing module 454.

According to an embodiment of the present disclosure, the accuracy converting module 453 may generate the second location data with the second degree of accuracy which is lower than the first degree of accuracy of the first location data based on the user configuration data (e.g., location configuration data, time configuration data, schedule configuration data, context configuration data, and application configuration data set by a user input).

According to an embodiment of the present disclosure, the location configuration data may include a first location set to provide the first location data by a user input and a second location set to provide the second location data by a user input. For example, based on the location configuration data, the accuracy converting module 453 may transfer the first location data to the data analyzing module 454 when the current location of the electronic device 400 corresponds to the first location, and the accuracy converting module 453 may generate the second location data and provide the generated second location data to the data analyzing module 454 when the current location of the electronic device 400 corresponds to the second location.

According to an embodiment of the present disclosure, the time configuration data may include data for a first time set to provide the first location data by a user input and data for a second time set to provide the second location data by a user input. For example, based on the time configuration data, the accuracy converting module 453 may transfer the first location data to the data analyzing module 454 when the current time of the electronic device 400 corresponds to the first time, and the accuracy converting module 453 may generate the second location data and provide the generated second location data to the data analyzing module 454 when the current time of the electronic device 400 corresponds to the second time.

According to an embodiment of the present disclosure, the schedule configuration data may include data for a first schedule set to provide the first location data by a user input and data for a second schedule set to provide the second location data by a user input. For example, based on the schedule configuration data, the accuracy converting module 453 may transfer the first location data to the data analyzing module 454 when the current schedule of the electronic device 400 corresponds to the first schedule, and the accuracy converting module 453 may generate the second location data and provide the generated second location data to the data analyzing module 454 when the current schedule of the electronic device 400 corresponds to the second schedule.

According to an embodiment of the present disclosure, the context configuration data may include data for a first status set to provide the first location data by a user input and data for a second status set to provide the second location data by a user input. For example, based on the context configuration data, the accuracy converting module 453 may transfer the first location data to the data analyzing module 454 when the current status of the electronic device 400 corresponds to the first status, and the accuracy converting module 453 may generate the second location data and provide the generated second location data to the data analyzing module 454 when the current status of the electronic device 400 corresponds to the second status.

According to an embodiment of the present disclosure, the application configuration data may include data for a first application set to provide the first location data by a user input and data for a second application set to provide the second location data by a user input. For example, based on the application configuration data, the accuracy converting module 453 may transfer the first location data to the data analyzing module 454 when the application currently running on the electronic device 400 corresponds to the first application, and the accuracy converting module 453 may generate the second location data and provide the generated second location data to the data analyzing module 454 when the application currently running on the electronic device 400 corresponds to the second application.

According to an embodiment of the present disclosure, the accuracy converting module 453 may use at least one of map coordinate data, such as the latitude or longitude, address data, POI data, use intimacy data, and past location data to generate the second location data with the second degree of accuracy which is lower than the first degree of accuracy.

According to an embodiment of the present disclosure, the accuracy converting module 453 may transfer coordinates (e.g., (37.776, −122.423), which are obtained by deleting the fourth and subsequent decimal places from the latitude-longitude coordinates (e.g., (37.776259, −122.423112)) corresponding to the current location of the electronic device 400, to the data analyzing module 454.

According to an embodiment of the present disclosure, the accuracy converting module 453 may transfer the name (e.g., San Francisco, Calif.) of an area larger than the detailed address (e.g., 315 Linden Street San Francisco, Calif. 94102) corresponding to the current location of the electronic device 400 to the data analyzing module 454.

According to an embodiment of the present disclosure, the accuracy converting module 453 may transfer a value obtained by converting the latitude-longitude coordinates (e.g., (37.776259, −122.423112) corresponding to the current location of the electronic device 400 into the POI (e.g., a blue bottle bay area) of an area larger than the current location of the electronic device 400 to the data analyzing module 454.

According to an embodiment of the present disclosure, the accuracy converting module 453 may transfer a value (e.g., Intimacy: 1) obtained by determining the user's degree of intimacy for the current location of the electronic device 400 and converting the determined degree of intimacy into a numerical value to the data analyzing module 454.

According to an embodiment of the present disclosure, the accuracy converting module 453 may transfer the detailed address for the place where the electronic device 400 was located one hour ago to the data analyzing module 454.

According to an embodiment of the present disclosure, the data analyzing module 454, upon receiving a first request signal for location data from the application program 460, may deliver a second request signal for the first location data or second location data to the accuracy converting module 453.

In response to the second request signal, the data analyzing module 454 may receive the first location data or second location data from the accuracy converting module 453. The data analyzing module 454 may transfer a response to the first request signal including the received first location data or second location data to a particular application.

According to an embodiment of the present disclosure, upon receiving the first request signal from the first application 461, the data analyzing module 454 may transfer the second request signal to the accuracy converting module 453. When receiving the second request signal, the accuracy converting module 453 may generate a second response signal including the first location data or second location data based on the accuracy determination standard and transfer the second response signal to the data analyzing module 454. For example, where the current location of the electronic device 400 corresponds to the office, the accuracy converting module 453 may transfer the second response signal including the first location data to the data analyzing module 454. When receiving the second response signal, the data analyzing module 454 may generate a first response signal including the first location data and transfer the first response signal to the first application 461.

According to an embodiment of the present disclosure, upon receiving the first request signal from the second application 462, the data analyzing module 454 may transfer the second request signal to the accuracy converting module 453. When receiving the second request signal, the accuracy converting module 453 may generate a second response signal including the first location data or second location data based on the accuracy determination standard and transfer the second response signal to the data analyzing module 454. For example, where the current location of the electronic device 400 corresponds to the home, the accuracy converting module 453 may generate the second location data and transfer the second response signal including the generated second location data to the data analyzing module 454. When receiving the second response signal, the data analyzing module 454 may generate a first response signal including the second location data and transfer the first response signal to the second application 462.

According to an embodiment of the present disclosure, upon receipt of a request signal for service information based on location data from the application program 460 (e.g., the first application 461 or the second application 462), the data analyzing module 454 may transfer the request signal to the accuracy converting module 453 and receive the first location data or second location data from the accuracy converting module 453. The data analyzing module 454 may generate service data based on the received first location data or second location data and transfer a response signal including the generated service data to the application program 460.

For example, upon receipt of a request signal for data about a recommended restaurant positioned around the current location of the electronic device 400 from the application program 460, the data analyzing module 454 may send a request for location data corresponding to the current location of the electronic device 400 to the accuracy converting module 453. When receiving a response including the first location data (e.g., Nara building, Yeoksam1-dong, Gangnam-gu, Seoul) from the accuracy converting module 453, the data analyzing module 454 searches for a recommended restaurant located around Nara building and transfers a response signal including data (e.g., the name, contact information, menu, price, or homepage address of the restaurant) about the recommended restaurant searched and the first location data to the application program 460. When receiving a response including the second location data (e.g., Yeoksam station, Gangnam-gu, Seoul) from the accuracy converting module 453, the data analyzing module 454 searches for a recommended restaurant located around Yeoksam station and transfers a response signal including data about the recommended restaurant searched and the second location data to the application program 460.

Referring to FIG. 6B, the location provision module 450 may include the location data gathering module 451, the accuracy converting module 453, the database 452, and the data analyzing module 454.

According to an embodiment of the present disclosure, the location data gathering module 451 may gather first location data for various locations of the electronic device 400 received from the location sensor 420 and store the gathered first location data in the database 452, as described above in connection with FIG. 6A.

According to an embodiment of the present disclosure, the location data gathering module 451 may further gather device data, such as time data, schedule data, context data, or application use data, as well as the location data and store the gathered device data in the database 452. For example, the first location data may include raw data for the plurality of locations of the electronic device 400.

According to an embodiment of the present disclosure, the accuracy converting module 453 may store the first location data in the database 452, or the accuracy converting module 453 may generate second location data with a second degree of accuracy which is lower than the first degree of accuracy of the first location data and store the second location data in the database 452.

According to an embodiment of the present disclosure, the accuracy converting module 453 may generate location data with various degrees of accuracy and store the location data in the database 452. For example, the accuracy converting module 453 may generate third location data with a third degree of accuracy that is higher than the second degree of accuracy and less than the first degree of accuracy or generate fourth location data with a fourth degree of accuracy that is lower than the second degree of accuracy.

According to an embodiment of the present disclosure, the database 452 may store the first location data and the second location data. According to an embodiment of the present disclosure, the database 452 may store location data with various degrees of accuracy, such as the third location data with the third degree of accuracy or the fourth location data with the fourth degree of accuracy.

According to an embodiment of the present disclosure, the database 452 may store the device data, such as time data, schedule data, context data, or application use data, gathered by the location data gathering module 451, as well as the first location data.

According to an embodiment of the present disclosure, upon receipt of a request signal for location data from the application program 460, the data analyzing module 454 may transfer the first location data or second location data to the application program 460 based on accuracy determination standard. According to an embodiment of the present disclosure, the data analyzing module 454 may transfer the first location data or second location data to the application program 460 based on accuracy determination data including various data of the electronic device 400.

According to an embodiment of the present disclosure, the data analyzing module 454 may determine whether the current location of the electronic device 400 corresponds to a first location or a second location, and the data analyzing module 454 may transfer the first location data stored in the database 452 to the application program 460 when the current location of the electronic device 400 corresponds to the first location, and transfer the second location data stored in the database 452 to the application program 460 when the current location of the electronic device 400 corresponds to the second location.

According to an embodiment of the present disclosure, the data analyzing module 454 may determine whether the current time of the electronic device 400 corresponds to a first time or a second time, and the data analyzing module 454 may transfer the first location data stored in the database 452 to the application program 460 when the current time of the electronic device 400 corresponds to the first time, and transfer the second location data stored in the database 452 to the application program 460 when the current time of the electronic device 400 corresponds to the second time.

According to an embodiment of the present disclosure, the data analyzing module 454 may determine whether the current schedule of the electronic device 400 corresponds to a first schedule or a second schedule, and the data analyzing module 454 may transfer the first location data stored in the database 452 to the application program 460 when the current schedule of the electronic device 400 corresponds to the first schedule, and transfer the second location data stored in the database 452 to the application program 460 when the current schedule of the electronic device 400 corresponds to the second schedule.

According to an embodiment of the present disclosure, the data analyzing module 454 may determine whether the current status of the electronic device 400 corresponds to a first status or a second status, and the data analyzing module 454 may transfer the first location data stored in the database 452 to the application program 460 when the current status of the electronic device 400 corresponds to the first status, and transfer the second location data stored in the database 452 to the application program 460 when the current status of the electronic device 400 corresponds to the second status.

According to an embodiment of the present disclosure, the data analyzing module 454 may determine whether at least one application running on the electronic device 400 corresponds to an application of interest or an application of no interest, and the data analyzing module 454 may transfer the first location data stored in the database 452 to the application program 460 when the current status of the electronic device 400 corresponds to the application of interest, and transfer the second location data stored in the database 452 to the application program 460 when the current status of the electronic device 400 corresponds to the application of no interest.

According to an embodiment of the present disclosure, the data analyzing module 454 may transfer the first location data or second location data to the application program 460 based on user configuration data set by a user input. For example, the data analyzing module 454 may use user configuration data set to provide the first location data or the second location data depending on the location, time, schedule, status, or application, by a user input. For example, where the current location, current time, current schedule, current status, or the application currently running on the electronic device corresponds to a location, time, schedule, status, or application set to provide the second location data, the data analyzing module 454 may transfer the second location data with the second degree of accuracy to the application program 460.

According to an embodiment of the present disclosure, upon receipt of a request signal for service information based on location data from the application program 460 (e.g., the first application 461 or the second application 462), the data analyzing module 454 may generate service data based on any one of the first location data and the second location data stored in the database 452 and transfer a response signal including the generated service data to the application program 460.

For example, upon receipt of a request signal for data about a recommended restaurant located around the current location of the electronic device 400 from the first application 461, the data analyzing module 454 may determine whether the first application 461 corresponds to an application of interest able to provide the first location data or an application of no interest able to provide the second location data. Where the first application 461 corresponds to the application of no interest, the data analyzing module 454 may generate service data based on the second location data stored in the database 452 and transfer the generated service data to the first application 461. For example, where the second location data is "Yeoksam-dong, Gangnam-gu, Seoul," the data analyzing module 454 may search for data about a recommended restaurant located in Yeoksam-dong and transfer a response signal including data about the recommended restaurant searched to the first application 461.

According to an embodiment of the present disclosure, the electronic device 400 may comprise the user interface 430, the location sensor 420 configured to sense a location of the electronic device 400, a processor 410 electrically connected with the user interface 430 and the location sensor 420, and the memory 440 electrically connected with the processor 410 and storing a first application program and a second application program. The memory may store instructions that, when executed, enable the processor 410 to receive first location data with a first degree of accuracy regarding the location of the electronic device 400 from the location sensor 420, process at least part of the first location data to generate second location data with a second degree of accuracy lower than the first degree of accuracy regarding the location of the electronic device 400, provide at least part of the first location data to execute the first application program, and provide at least part of the second location data to execute the second application program.

According to an embodiment of the present disclosure, the first location data may include raw data from the location sensor 420.

According to an embodiment of the present disclosure, the first location data may include a full address for the location of the electronic device 400, and the second location data may include only area information covering the full address.

According to an embodiment of the present disclosure, the memory 440 may store a third application program. The instructions may enable the processor 410 to process at least part of at least one of the first location data and the second location data to generate third location data with a third degree of accuracy regarding the location of the electronic device 400, which is lower than the second degree of accuracy, and to provide at least part of the third location data to execute the third application program.

According to an embodiment of the present disclosure, the instructions may enable the processor 410 to allow a user to select the first location data for the first application program and the second location data for the second application program through the user interface 430.

According to an embodiment of the present disclosure, the instructions may enable the processor 410 to determine a context based on at least part of a user input through the user interface 430 and to select the first location data to execute the first application program and the second location data to execute the second application program.

According to an embodiment of the present disclosure, the location sensor 420 may include at least one of a GPS sensor, a BT circuit, a Wi-Fi circuit, and a cellular communication circuit.

Figure 7A:
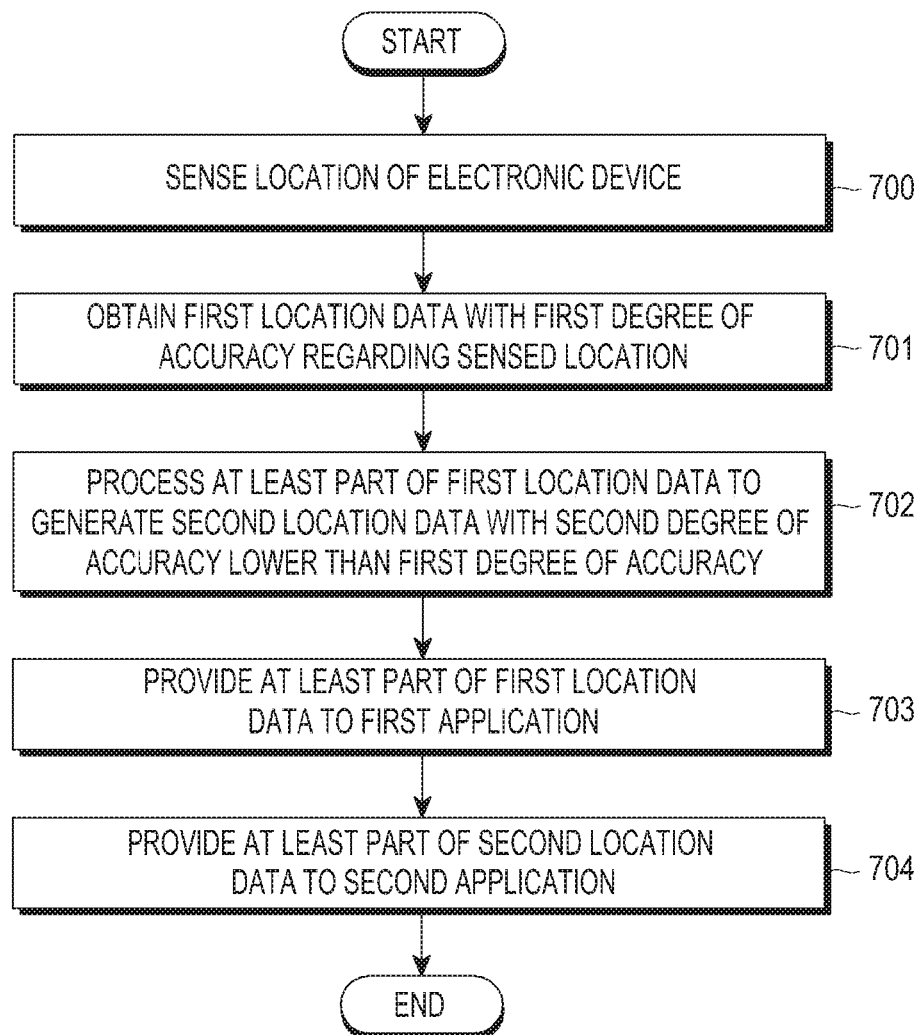
FIGS. 7A and 7B are flowcharts illustrating methods for providing location data in an electronic device according to various embodiments of the present disclosure.
Figure 7B:
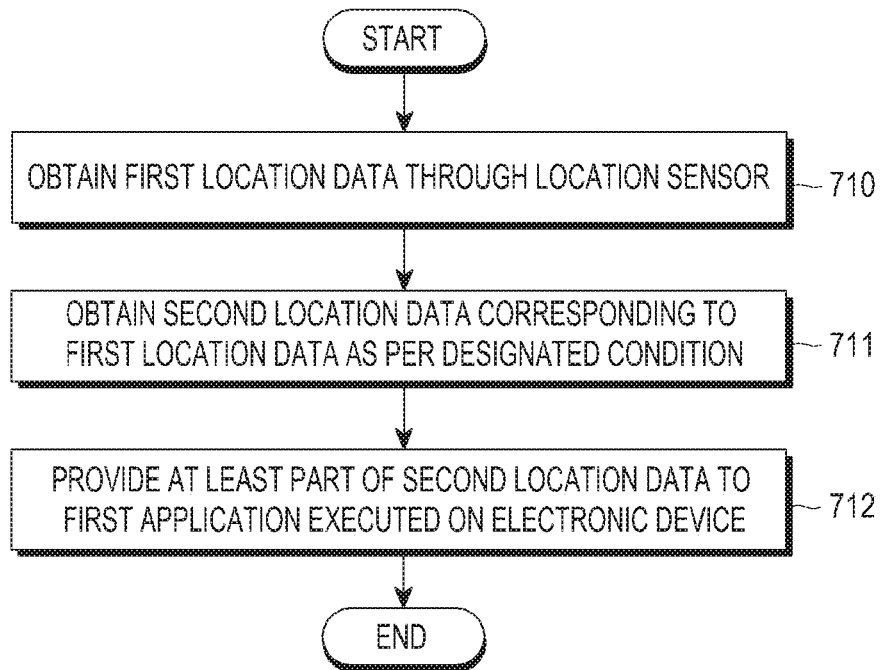

FIGS. 7A and 7B are flowcharts illustrating methods for providing location data in an electronic device according to various embodiments of the present disclosure.

According to an embodiment of the present disclosure, operations 700 to 704 and operations 710 to 712 may be performed by any one of the electronic device 101, the first and second external electronic devices 102 and 104, the electronic device 201, the electronic device 400, the server 106, the processor 120, 210, or 410, the program module 310, and the location provision module 450.

Referring to FIG. 7A, the electronic device 400 (e.g., the processor 410) may sense the location of the electronic device 400, in operation 700. According to an embodiment of the present disclosure, the electronic device 400 (e.g., the processor 410) may sense the location of the electronic device 400 through the location sensor 420.

In operation 701, the electronic device 400 (e.g., the processor 410) may obtain first location data with a first degree of accuracy regarding the sensed location. According to an embodiment of the present disclosure, the electronic device 400 (e.g., the processor 410) may store the first location data in the memory 440.

In operation 702, the electronic device 400 (e.g., the processor 410) may process at least part of the first location data to generate second location data with a second degree of accuracy that is lower than the first degree of accuracy. According to an embodiment of the present disclosure, the electronic device 400 (e.g., the processor 410) may execute the location provision module 450 to generate the second location data with the second degree of accuracy which is lower than the first degree of accuracy of the first location data according to an accuracy determination standard.

In operation 703, the electronic device 400 (e.g., the processor 410) may provide at least part of the first location data to a first application. According to an embodiment of the present disclosure, the electronic device 400 (e.g., the processor 410), upon determining that the first application is an application able to provide the first location data, may provide at least part of the first location data to the first application.

In operation 704, the electronic device 400 (e.g., the processor 410) may provide at least part of the second location data to a second application. According to an embodiment of the present disclosure, the electronic device 400 (e.g., the processor 410), upon determining that the second application is an application able to provide the second location data, may provide at least part of the second location data to the second application.

Referring to FIG. 7B, the electronic device 400 (e.g., the processor 410) may obtain first location data regarding the location of the electronic device 400 through the location sensor 420, in operation 710.

In operation 711, the electronic device 400 (e.g., the processor 410) may obtain second location data corresponding to the first location data according to a designated condition.

According to an embodiment of the present disclosure, the electronic device 400 (e.g., the processor 410) may generate the second location data with a second degree of accuracy that is lower than a first degree of accuracy of the first location data according to a preset accuracy determination standard. For example, the electronic device 400 (e.g., the processor 410) may generate the second location data based on accuracy determination data or user configuration data.

In operation 712, the electronic device 400 (e.g., the processor 410) may provide at least part of the second location data to a first application that is executed on the electronic device 400. For example, when set to provide the second location data to the first application, the electronic device 400 (e.g., the processor 410) may provide the first application with an address for an area including the location of the electronic device 400 or an address for a second area larger than a first area corresponding to the location of the electronic device 400.

According to an embodiment of the present disclosure, a method for operating the electronic device 400 may comprise receiving first location data with a first degree of accuracy regarding a location of the electronic device 400 from the location sensor 420, processing at least part of the first location data to generate second location data with a second degree of accuracy lower than the first degree of accuracy regarding the location of the electronic device, providing at least part of the first location data to execute a first application program, and providing at least part of the second location data to execute a second application program.

According to an embodiment of the present disclosure, the first location data may include raw location data from the location sensor 420.

According to an embodiment of the present disclosure, the first location data may include a full address for the location of the electronic device 400, and the second location data may include only area information covering the full address.

According to an embodiment of the present disclosure, the method may further comprise processing at least part of at least one of the first location data and the second location data to generate third location data with a third degree of accuracy regarding the location of the electronic device 400, which is lower than the second degree of accuracy and providing at least part of the third location data to execute the third application program.

According to an embodiment of the present disclosure, the method may further comprise allowing a user to select the first location data for the first application program and the second location data for the second application program through the user interface 430.

According to an embodiment of the present disclosure, the method may further comprise determining a context based on at least part of a user input through the user interface 430, selecting the first location data to execute the first application program, and selecting the second location data to execute the second application program.

According to an embodiment of the present disclosure, the location sensor 420 may include at least one of a GPS sensor, a BT circuit, a Wi-Fi circuit, and a cellular communication circuit.

Figure 8:
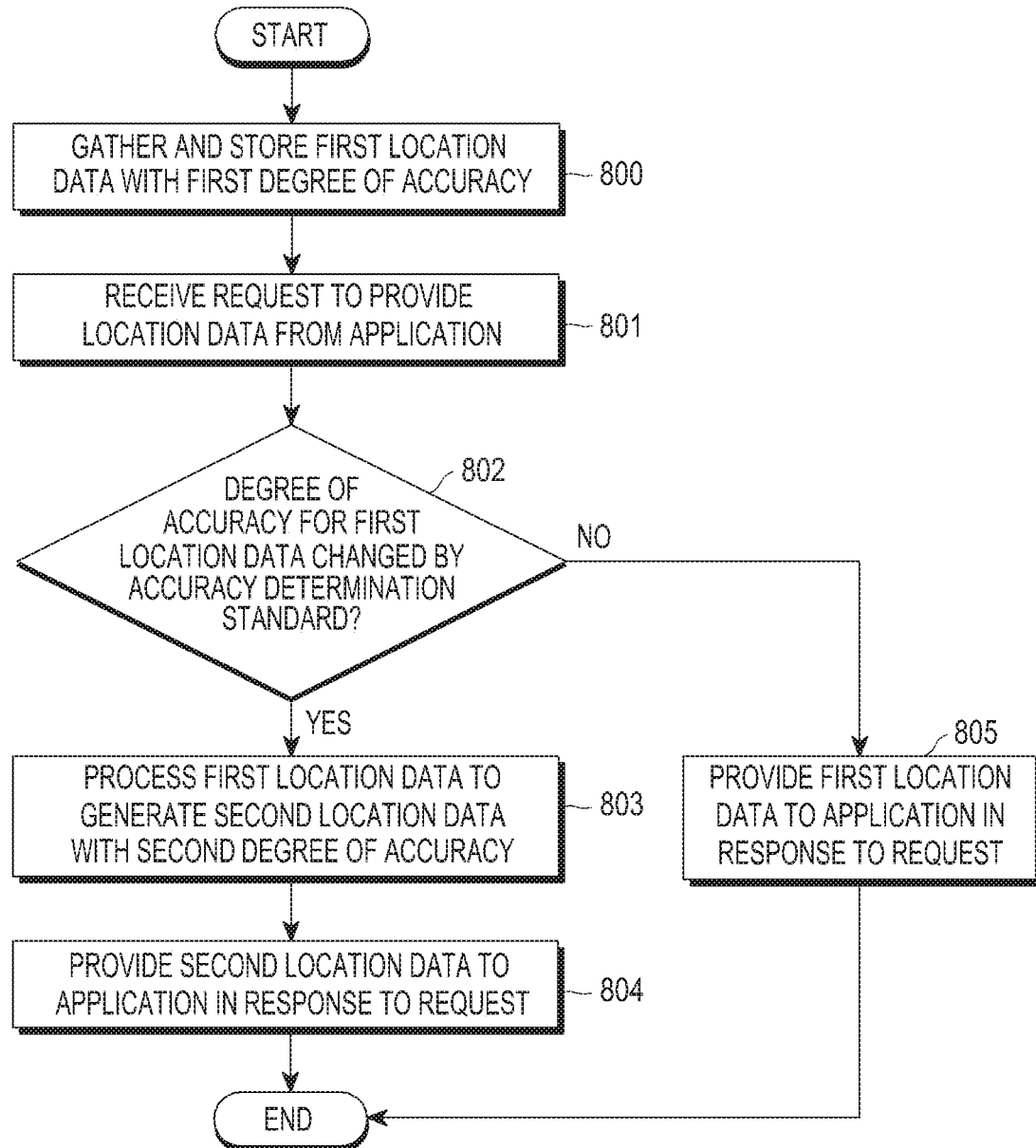
FIG. 8 is a flowchart illustrating a method for providing location data in an electronic device according to an embodiment of the present disclosure.

FIG. 8 is a flowchart illustrating a method for providing location data in an electronic device according to an embodiment of the present disclosure.

According to an embodiment of the present disclosure, operations 800 to 805 may be performed by any one of the electronic device 101, the first and second external electronic devices 102 and 104, the electronic device 201, the electronic device 400, the server 106, the processor 120, 210, or 410, the program module 310, and the location provision module 450.

Referring to FIG. 8, the electronic device 400 (e.g., the processor 410) may gather and store first location data with a first degree of accuracy, in operation 800. According to an embodiment of the present disclosure, the electronic device 400 (e.g., the processor 410) may gather the first location data regarding the location of the electronic device 400 which is sensed through the location sensor 420 and store the gathered first location data in the memory 440.

In operation 801, the electronic device 400 (e.g., the processor 410) may receive a request to provide location data from an application.

In operation 802, the electronic device 400 (e.g., the processor 410) may determine whether to change the degree of accuracy for the stored first location data according to an accuracy determination standard, and the electronic device 400 (e.g., the processor 410) may perform operation 803 when changing the degree of accuracy for the first location data or operation 805 when not changing the degree of accuracy for the first location data.

In operation 803, the electronic device 400 (e.g., the processor 410) may process the first location data to generate second location data with a second degree of accuracy.

In operation 804, the electronic device 400 (e.g., the processor 410) may provide the second location data to the application in response to a request.

In operation 805, the electronic device 400 (e.g., the processor 410) may provide the first location data to the application in response to a request.

Figure 9:
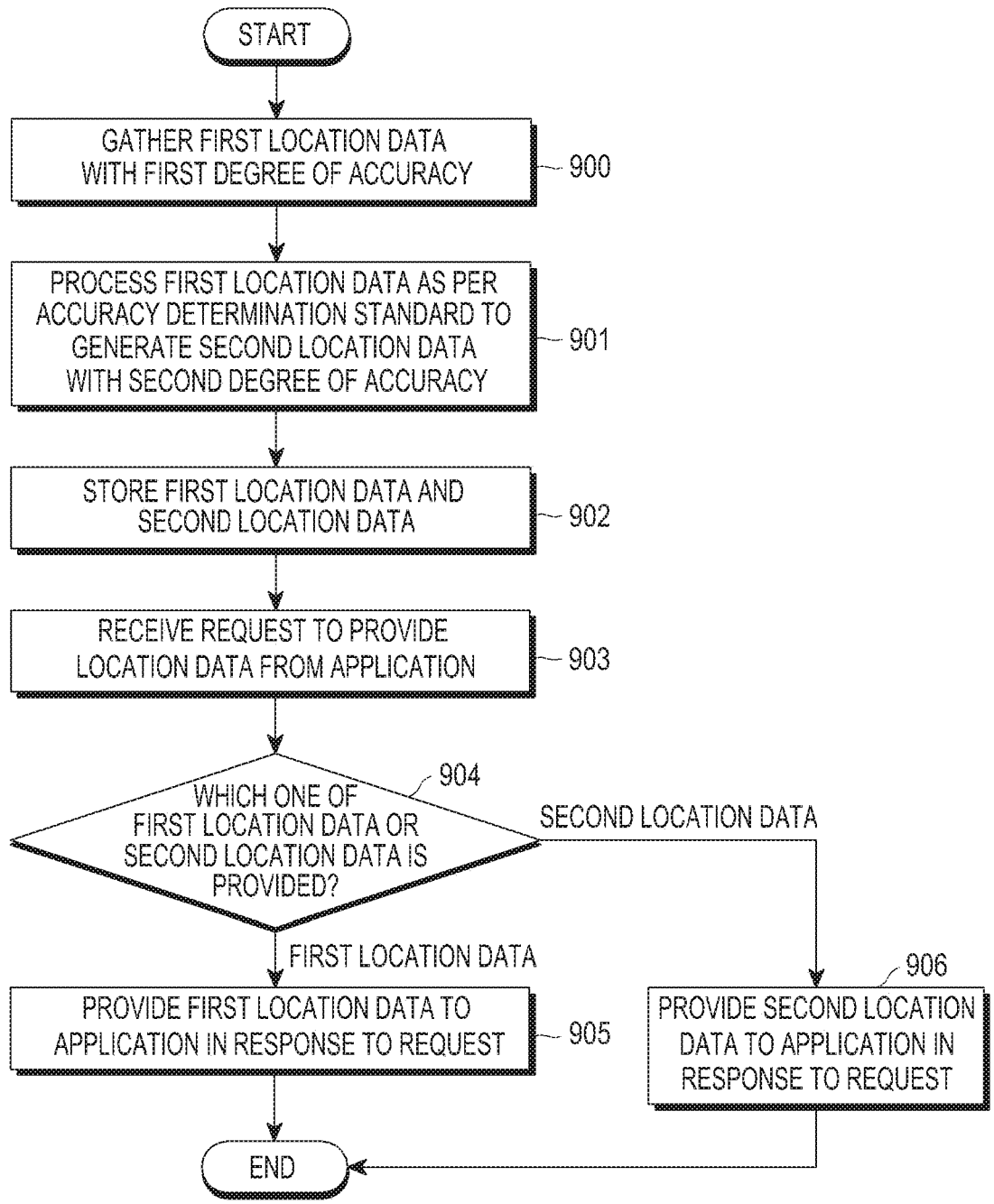
FIG. 9 is a flowchart illustrating a method for providing location data in an electronic device according to an embodiment of the present disclosure.

FIG. 9 is a flowchart illustrating a method for providing location data in an electronic device according to an embodiment of the present disclosure.

According to an embodiment of the present disclosure, operations 900 to 906 may be performed by any one of the electronic device 101, the first and second external electronic devices 102 and 104, the electronic device 201, the electronic device 400, the server 106, the processor 120, 210, or 410, the program module 310, and the location provision module 450.

Referring to FIG. 9, the electronic device 400 (e.g., the processor 410) may gather first location data with a first degree of accuracy, in operation 900. According to an embodiment of the present disclosure, the electronic device 400 (e.g., the processor 410) may gather the first location data regarding the location of the electronic device 400 which is sensed through the location sensor 420.

In operation 901, the electronic device 400 (e.g., the processor 410) may process the first location data according to an accuracy determination standard, generating second location data with a second degree of accuracy.

In operation 902, the electronic device 400 (e.g., the processor 410) may store the first location data and the second location data. According to an embodiment of the present disclosure, the electronic device 400 (e.g., the processor 410) may store the gathered first location data and the generated second location data in the memory 440.

In operation 903, the electronic device 400 (e.g., the processor 410) may receive a request to provide location data from an application.

In operation 904, the electronic device 400 (e.g., the processor 410) may determine whether to provide the first location data or the second location data, and the electronic device 400 (e.g., the processor 410) may perform operation 905 upon determining to provide the first location data or operation 906 upon determining to provide the second location data.

In operation 905, the electronic device 400 (e.g., the processor 410) may provide the first location data to the application in response to a request.

In operation 906, the electronic device 400 (e.g., the processor 410) may provide the second location data to the application in response to a request.

Figure 10:
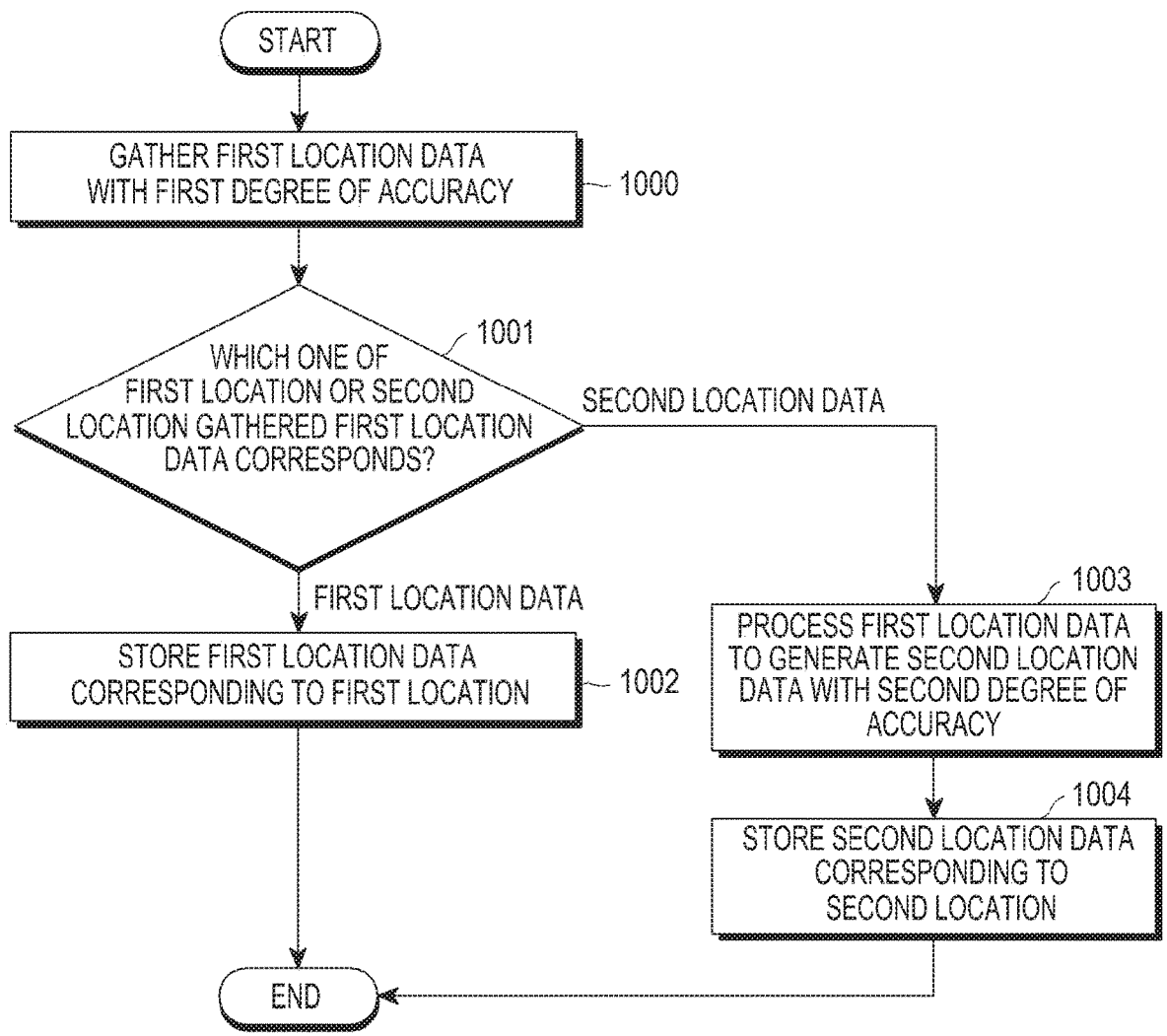
FIG. 10 is a flowchart illustrating a method for generating second location data in an electronic device according to an embodiment of the present disclosure.

FIG. 10 is a flowchart illustrating a method for generating second location data in an electronic device according to an embodiment of the present disclosure.

According to an embodiment of the present disclosure, operations 1000 to 1004 may be performed by any one of the electronic device 101, the first and second external electronic devices 102 and 104, the electronic device 201, the electronic device 400, the server 106, the processor 120, 210, or 410, the program module 310, and the location provision module 450.

Referring to FIG. 10, the electronic device 400 (e.g., the processor 410) may gather first location data with a first degree of accuracy, in operation 1000.

In operation 1001, the electronic device 400 (e.g., the processor 410) may determine whether the gathered first location data corresponds to a first location or a second location, and the electronic device 400 (e.g., the processor 410) may perform operation 1002 when the first location data is determined to correspond to the first location and operation 1003 when the first location data is determined to correspond to the second location. For example, the first location may be a location where detailed information about the location of the electronic device 400 may be published, and the second location may be a location where the detailed information about the location of the electronic device 400 may not be published. The second location may be a location where location data for an area larger than the location of the electronic device 400 may be published.

In operation 1002, the electronic device 400 (e.g., the processor 410) may store the first location data corresponding to the first location. For example, the first location data may include the detailed address (e.g., an address including the city, district, neighborhood, house number, or building name) regarding the location of the electronic device 400.

In operation 1003, the electronic device 400 (e.g., the processor 410) may process the first location data to generate second location data with a second degree of accuracy. For example, the second location data may include the address (e.g., an address including only the city and district name) of an area covering the detailed address regarding the location of the electronic device 400.

In operation 1004, the electronic device 400 (e.g., the processor 410) may store the second location data corresponding to the second location.

Figure 11:
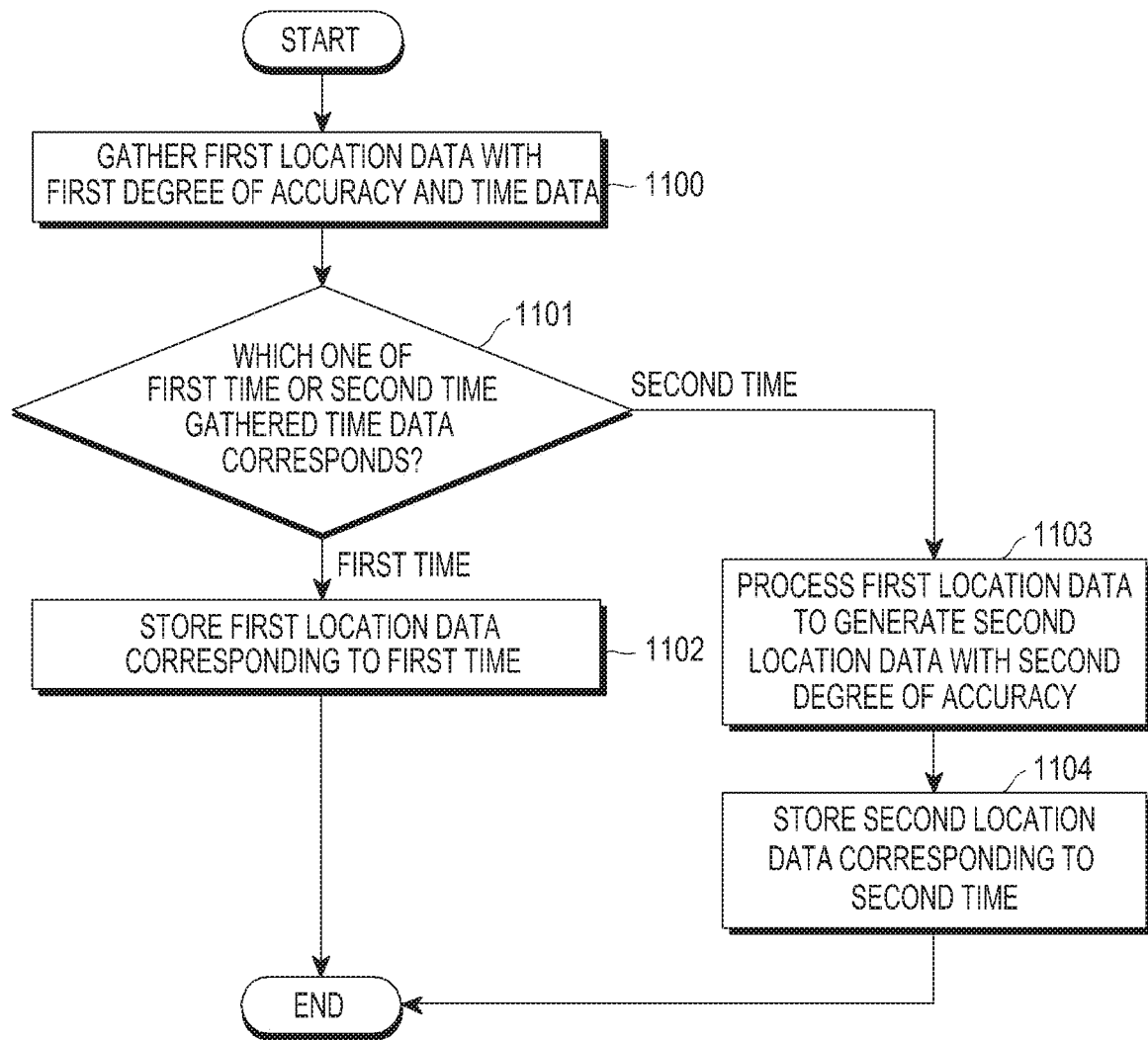
FIG. 11 is a flowchart illustrating a method for generating second location data in an electronic device according to an embodiment of the present disclosure.

FIG. 11 is a flowchart illustrating a method for generating second location data in an electronic device according to an embodiment of the present disclosure.

According to an embodiment of the present disclosure, operations 1100 to 1104 may be performed by any one of the electronic device 101, the first and second external electronic devices 102 and 104, the electronic device 201, the electronic device 400, the server 106, the processor 120, 210, or 410, the program module 310, and the location provision module 450.

Referring to FIG. 11, the electronic device 400 (e.g., the processor 410) may gather time data and first location data with a first degree of accuracy, in operation 1100.

In operation 1101, the electronic device 400 (e.g., the processor 410) may determine whether the gathered time data corresponds to a first time or a second time, and the electronic device 400 (e.g., the processor 410) may perform operation 1102 when the time data is determined to correspond to the first time and operation 1103 when the time data is determined to correspond to the second time. For example, the first time may be a time when detailed information about the location of the electronic device 400 may be published, and the second time may be a time when the detailed information about the location of the electronic device 400 may not be published. The second time may be a time when location data for an area larger than the location of the electronic device 400 may be published.

In operation 1102, the electronic device 400 (e.g., the processor 410) may store the first location data corresponding to the first time.

In operation 1103, the electronic device 400 (e.g., the processor 410) may process the first location data to generate second location data with a second degree of accuracy.

In operation 1104, the electronic device 400 (e.g., the processor 410) may store the second location data corresponding to the second time.

Figure 12:
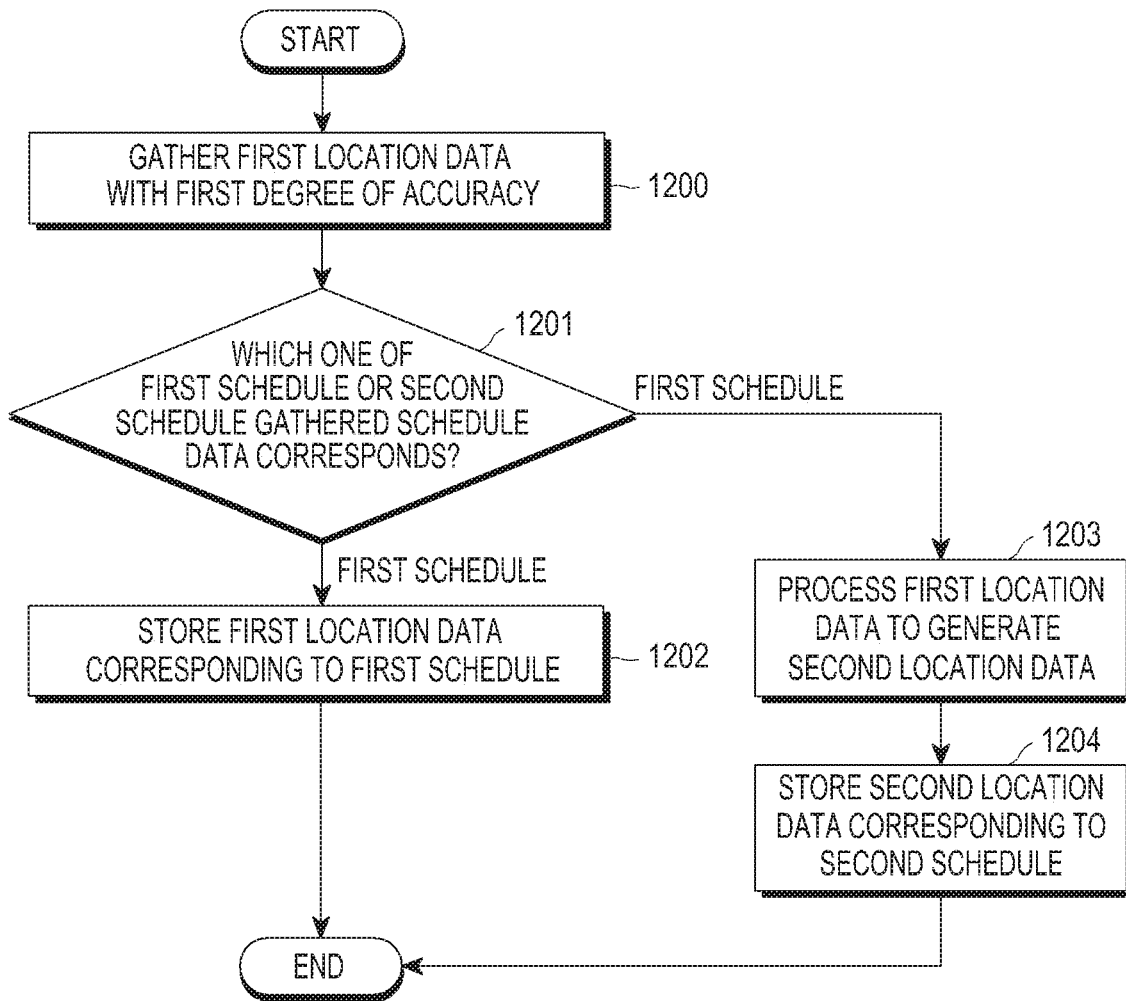
FIG. 12 is a flowchart illustrating a method for generating second location data in an electronic device according to an embodiment of the present disclosure.

FIG. 12 is a flowchart illustrating a method for generating second location data in an electronic device according to an embodiment of the present disclosure.

According to an embodiment of the present disclosure, operations 1200 to 1204 may be performed by any one of the electronic device 101, the first and second external electronic devices 102 and 104, the electronic device 201, the electronic device 400, the server 106, the processor 120, 210, or 410, the program module 310, and the location provision module 450.

Referring to FIG. 12, the electronic device 400 (e.g., the processor 410) may gather schedule information and first location data with a first degree of accuracy, in operation 1200.

In operation 1201, the electronic device 400 (e.g., the processor 410) may determine whether the gathered schedule information corresponds to a first schedule or a second schedule, and the electronic device 400 (e.g., the processor 410) may perform operation 1202 when the schedule information is determined to correspond to the first schedule and operation 1203 when the schedule information is determined to correspond to the second schedule. For example, the first schedule may be a schedule where detailed information about the location of the electronic device 400 may be published, and the second schedule may be a schedule when the detailed information about the location of the electronic device 400 may not be published. The second schedule may be a schedule where location data for an area larger than the location of the electronic device 400 may be published.

In operation 1202, the electronic device 400 (e.g., the processor 410) may store the first location data corresponding to the first schedule.

In operation 1203, the electronic device 400 (e.g., the processor 410) may process the first location data to generate second location data with a second degree of accuracy.

In operation 1204, the electronic device 400 (e.g., the processor 410) may store the second location data corresponding to the second schedule.

Figure 13:
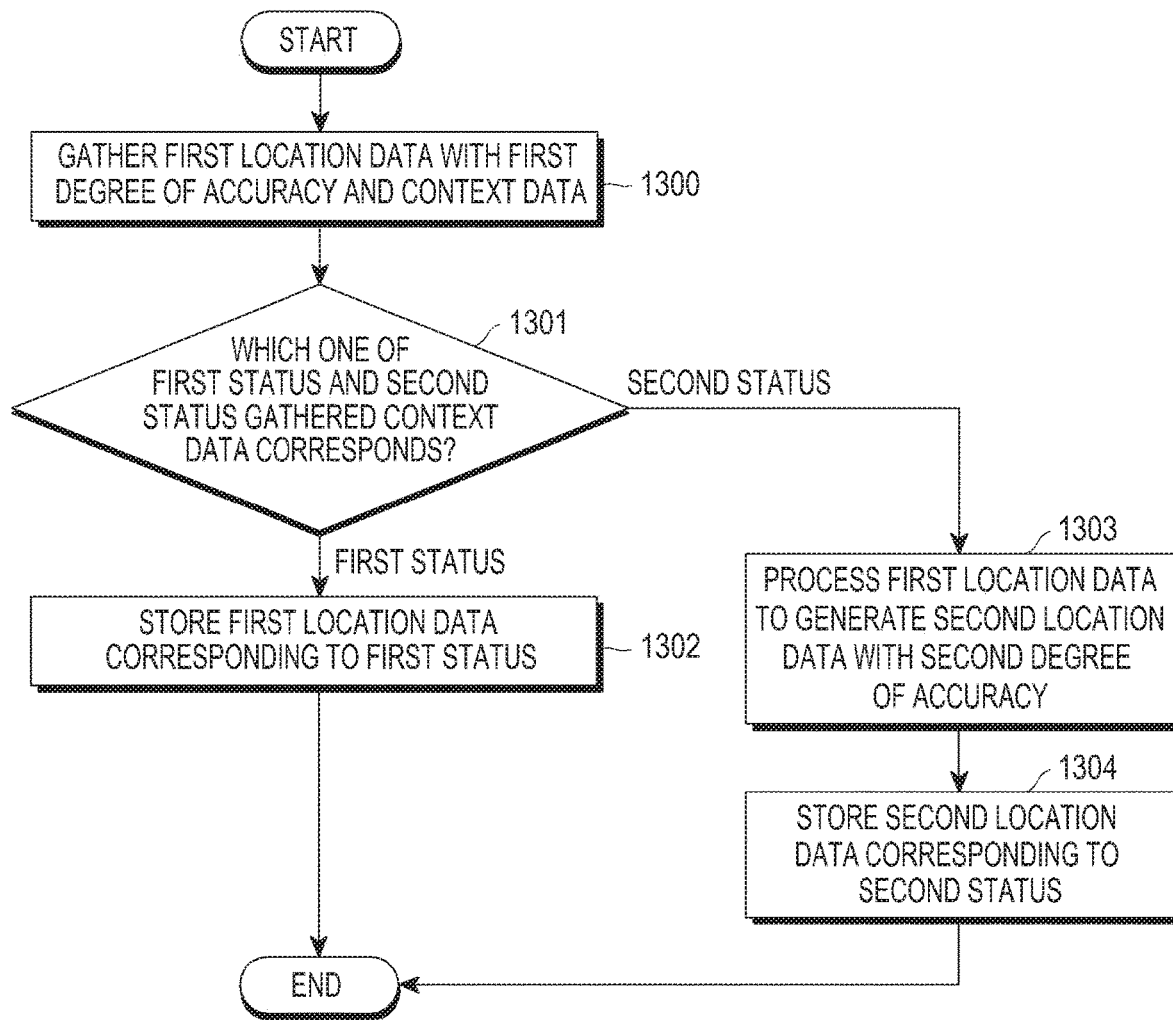
FIG. 13 is a flowchart illustrating a method for generating second location data in an electronic device according to an embodiment of the present disclosure.

FIG. 13 is a flowchart illustrating a method for generating second location data in an electronic device according to an embodiment of the present disclosure.

According to an embodiment of the present disclosure, operations 1300 to 1304 may be performed by any one of the electronic device 101, the first and second external electronic devices 102 and 104, the electronic device 201, the electronic device 400, the server 106, the processor 120, 210, or 410, the program module 310, and the location provision module 450.

Referring to FIG. 13, the electronic device 400 (e.g., the processor 410) may gather context information and first location data with a first degree of accuracy, in operation 1300.

In operation 1301, the electronic device 400 (e.g., the processor 410) may determine whether the gathered context information corresponds to a first status or a second status, and the electronic device 400 (e.g., the processor 410) may perform operation 1302 when the context information is determined to correspond to the first status and operation 1303 when the context information is determined to correspond to the second status. For example, the first status may be a status where detailed information about the location of the electronic device 400 may be published, and the second status may be a status when the detailed information about the location of the electronic device 400 may not be published. The second status may be a status where location data for an area larger than the location of the electronic device 400 may be published.

In operation 1302, the electronic device 400 (e.g., the processor 410) may store the first location data corresponding to the first status.

In operation 1303, the electronic device 400 (e.g., the processor 410) may process the first location data to generate second location data with a second degree of accuracy.

In operation 1304, the electronic device 400 (e.g., the processor 410) may store the second location data corresponding to the second status.

Figure 14:
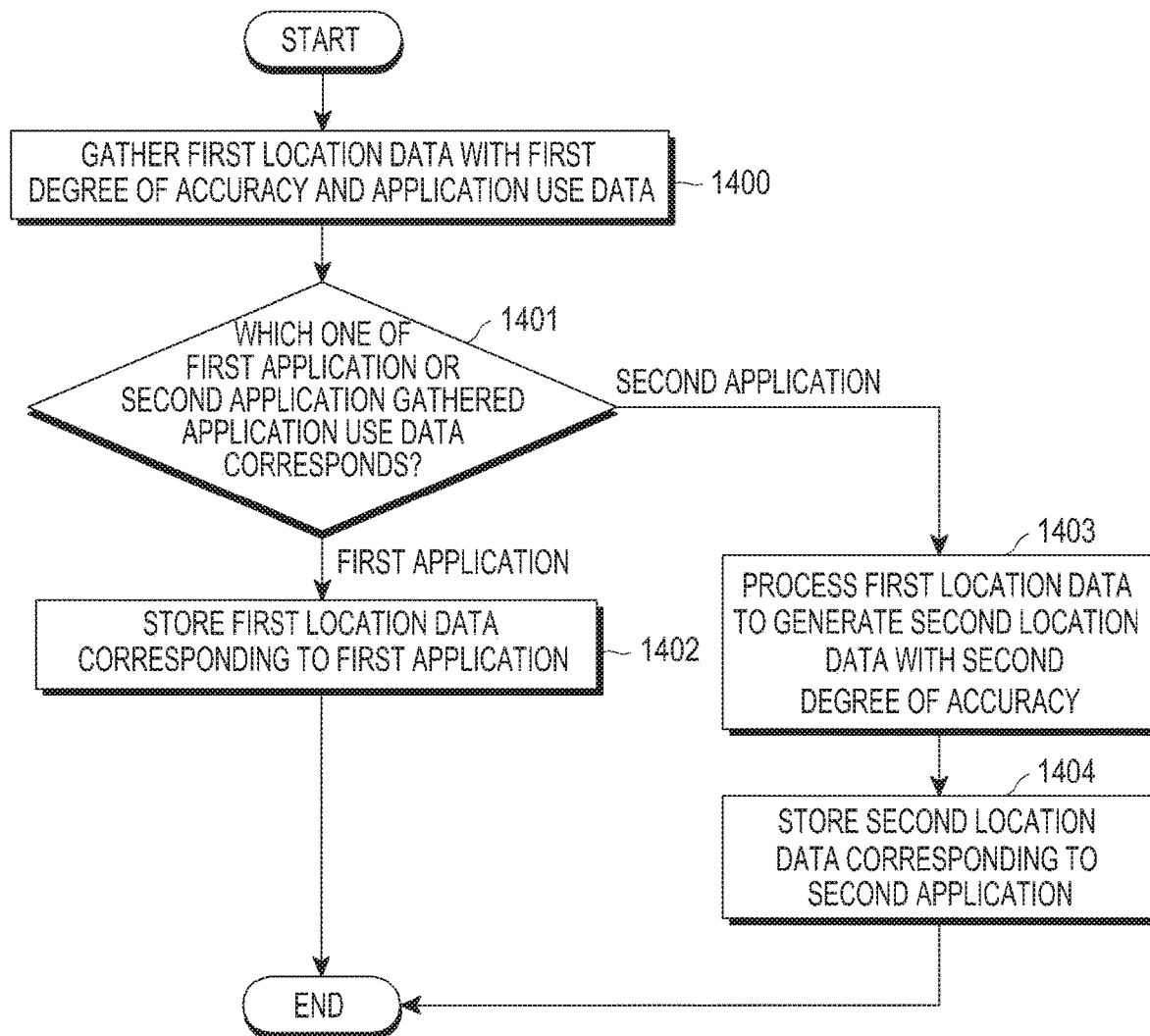
FIG. 14 is a flowchart illustrating a method for generating second location data in an electronic device according to an embodiment of the present disclosure.

FIG. 14 is a flowchart illustrating a method for generating second location data in an electronic device according to an embodiment of the present disclosure.

According to an embodiment of the present disclosure, operations 1400 to 1404 may be performed by any one of the electronic device 101, the first and second external electronic devices 102 and 104, the electronic device 201, the electronic device 400, the server 106, the processor 120, 210, or 410, the program module 310, and the location provision module 450.

Referring to FIG. 14, the electronic device 400 (e.g., the processor 410) may gather application use data and first location data with a first degree of accuracy, in operation 1400.

In operation 1401, the electronic device 400 (e.g., the processor 410) may determine whether the gathered application use data corresponds to a first application or a second application, and the electronic device 400 (e.g., the processor 410) may perform operation 1402 when the application use data is determined to correspond to the first application and operation 1403 when the application use data is determined to correspond to the second application. For example, the first application may be an application that may publish detailed information about the location of the electronic device 400, and the second application may be an application that may not publish the detailed information about the location of the electronic device 400. The second application may be an application that may publish location data for an area larger than the location of the electronic device 400.

In operation 1402, the electronic device 400 (e.g., the processor 410) may store the first location data corresponding to the first application.

In operation 1403, the electronic device 400 (e.g., the processor 410) may process the first location data to generate second location data with a second degree of accuracy.

In operation 1404, the electronic device 400 (e.g., the processor 410) may store the second location data corresponding to the second application.

According to an embodiment of the present disclosure, a method for operating the electronic device 400 may comprise receiving first location data with a first degree of accuracy regarding a location of the electronic device 400 from the location sensor 420, processing at least part of the first location data to generate second location data with a second degree of accuracy lower than the first degree of accuracy regarding the location of the electronic device, providing at least part of the first location data to execute a first application program, and providing at least part of the second location data to execute a second application program.

FIGS. 15A, 15B, 15C, 15D, 15E, and 15F are views illustrating examples of user interfaces for setting accuracy determination data in an electronic device according to various embodiments of the present disclosure.

Figure 15A:
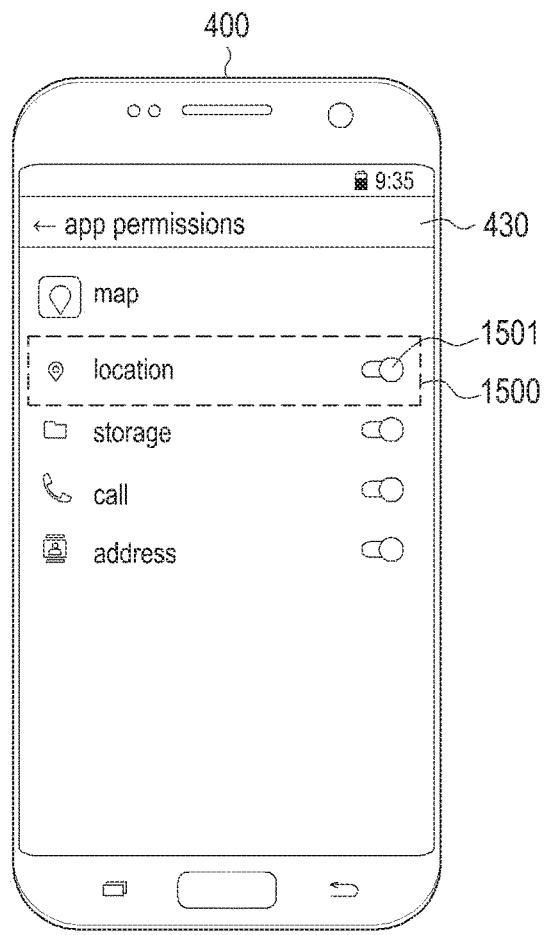
FIGS. 15A, 15B, 15C, 15D, 15E, and 15F are views illustrating examples of user interfaces for setting accuracy determination data in an electronic device according to various embodiments of the present disclosure.

Referring to FIG. 15A, the electronic device 400 (e.g., the processor 410) may display, on the user interface 430, a setting screen for adjusting the degree of accuracy of location data provided to at least one application (e.g., a map application).

According to an embodiment of the present disclosure, the setting screen may include a menu section 1500 to make settings to provide first location data or second location data. The menu section 1500 may include a button 1501 for a first setting (e.g., active) for adjusting the degree of accuracy of the first location data according to a user input or a second setting (e.g., inactive) for providing the first location data without adjusting the degree of accuracy of the location data. For example, where the button 1501 is a slide button, the electronic device 400 (e.g., the processor 410) may make a setting to provide the first location data upon receipt of an input to move the slide button to the left, adjust the degree of accuracy of the first location data and provide the accuracy-adjusted first location data upon receipt of an input to move the slide button to the right.

According to an embodiment of the present disclosure, the electronic device 400 (e.g., the processor 410) may move the button 1501 to the left or right according to a user input (e.g., a touch input) through the user interface 430, making a setting to provide the first location data or second location data. For example, the electronic device 400 (e.g., the processor 410) may make a setting to provide the first location data to a map application upon sensing a touch to move the button 1501 to the left through the user interface 430. The electronic device 400 (e.g., the processor 410) may make a setting to provide the second location data to the map application upon sensing a touch to move the button 1501 to the right through the user interface 430.

Figure 15B:
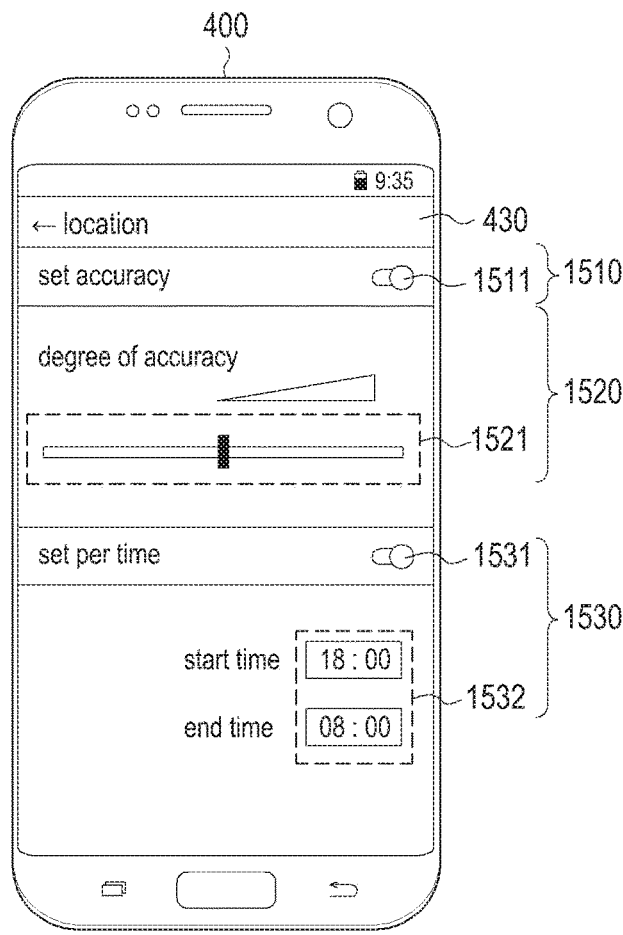

Referring to FIG. 15B, the electronic device 400 (e.g., the processor 410) may display, on the user interface 430, a setting screen for adjusting the degree of accuracy of location data provided to at least one application (e.g., a map application).

According to an embodiment of the present disclosure, the setting screen may include a first menu section 1510 for making a setting to provide first location data or second location data, a second menu section 1520 for adjusting the degree of accuracy of the second location data, and a third menu section 1530 for setting a time to provide the second location data.

According to an embodiment of the present disclosure, the first menu section 1510 may include a button 1511 for activating a function for making a setting to provide the first location data or second location data according to a user input.

According to an embodiment of the present disclosure, the electronic device 400 (e.g., the processor 410) may move the button 1511 to the left or right according to a user input (e.g., a touch input), making a setting to provide the first location data or to adjust the degree of accuracy of the first location data and provide the accuracy-adjusted first location data. For example, the electronic device 400 (e.g., the processor 410) may make a setting to provide the first location data upon sensing a touch input to move the button 1511 to the left through the user interface 430. The electronic device 400 (e.g., the processor 410) may make a setting to adjust and provide the first location data upon sensing a touch input to move the button 1511 to the right through the user interface 430.

According to an embodiment of the present disclosure, upon receipt of a touch input to move the button 1511 of the first menu section 1510 to the left, the electronic device 400 (e.g., the processor 410) may deactivate the second menu section 1520 and the third menu section 1530 except for the first menu section 1510. For example, the deactivation may refer to a state of receiving no user input (e.g., a state of sensing no touch) while displaying the second menu section 1520 and the third menu section 1530 in a particular color. Upon receipt of a touch input to move the button 1511 to the right through the user interface 430, the electronic device 400 (e.g., the processor 410) may activate and display the second menu section 1520 and the third menu section 1530.

According to an embodiment of the present disclosure, the second menu section 1520 may include a status bar 1521 for setting the degree (or scale) of accuracy of the first location data.

According to an embodiment of the present disclosure, the electronic device 400 (e.g., the processor 410) may adjust the degree of accuracy of the first location data by moving the status bar 1521 to the left or right according to a user input (e.g., a touch input). The electronic device 400 (e.g., the processor 410) may adjust a first degree of accuracy (e.g., a detailed address) of the first location data into a second degree of accuracy lower than the first degree of accuracy (or into a third degree of accuracy lower than the second degree of accuracy) or may adjust the third degree of accuracy into the second degree of accuracy or the first degree of accuracy. For example, the electronic device 400 (e.g., the processor 410) may adjust the degree of accuracy of the first location data in neighborhood units or district units.

According to an embodiment of the present disclosure, the third menu section 1530 may include a button 1531 for activating a function for setting a time to provide the second location data and a time input section 1532 for inputting a start time and an end time to provide the second location data.

According to an embodiment of the present disclosure, the electronic device 400 (e.g., the processor 410) may make a setting to provide the second location data for a period of time, as entered, upon receipt of a user input (e.g., a touch input or an input to the touch pad), such as entry or selection of numbers for inputting a start time and an end time through the user interface 430. For example, the electronic device 400 (e.g., the processor 410) may provide the second location data from 6 pm of the day to 8 am of the next day according to a user input for setting 6 pm to the start time and 8 am to the end time.

Figure 15C:
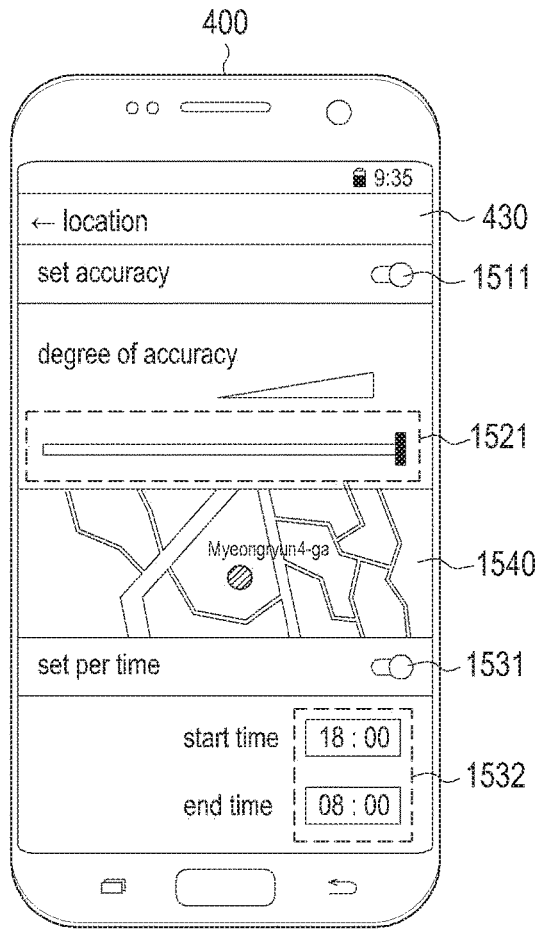
Figure 15D:
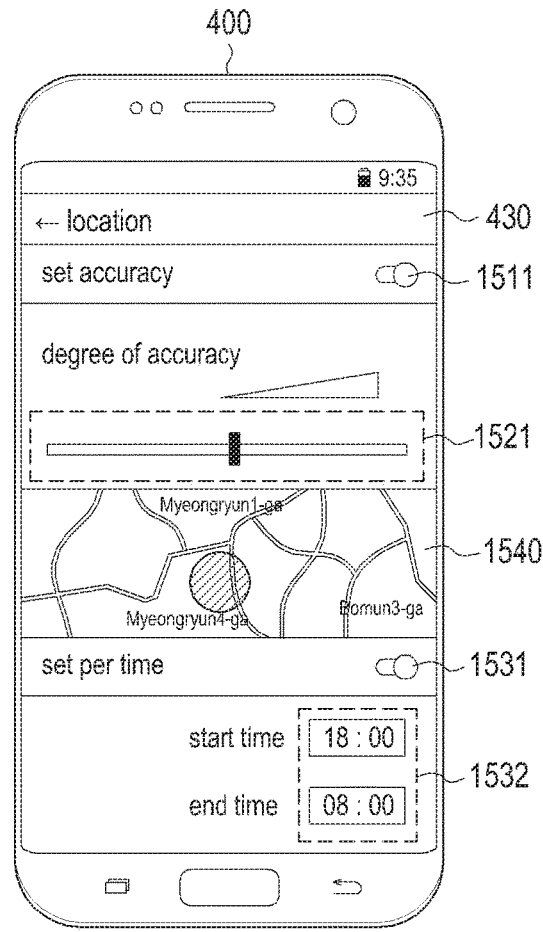
Figure 15E:
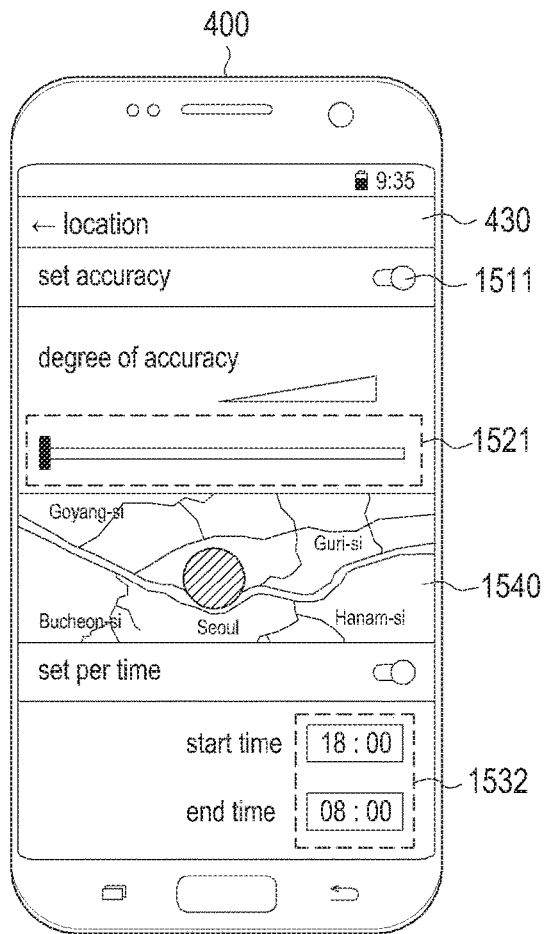

Referring to FIGS. 15C, 15D, and 15E, when the indicator is positioned in the right side of the status bar 1521 as shown in FIG. 15C, the electronic device 400 (e.g., the processor 410) may make a setting to provide location data with a first degree of accuracy that includes a detailed address, such as "Mihwa Building, 110-2, Myeongryun-4ga, Jongro-gu, Seoul, South Korea." The electronic device 400 (e.g., the processor 410) may further display an example screen 1540 of the degree-of-accuracy-adjusted location data under the status bar 1521. For example, the electronic device 400 (e.g., the processor 410) may further display a map screen corresponding to the detailed address, "Mihwa Building, 110-2, Myeongryun4-ga, Jongro-gu, Seoul, South Korea."

When the indicator is positioned in the middle of the status bar 1521 as shown in FIG. 15D, the electronic device 400 (e.g., the processor 410) may make a setting to provide second location data with a second degree of accuracy that includes a simplified address, such as "Myeongryun-4ga, Jongro-gu, Seoul, South Korea," which corresponds to a larger area including the location indicated by the detailed address and includes the neighborhood name. For example, the electronic device 400 (e.g., the processor 410) may further display a map screen corresponding to the simplified address "Myeongryun4-ga, Jongro-gu, Seoul, South Korea."

When the indicator is positioned in the left side of the status bar 1521 as shown in FIG. 15E, the electronic device 400 (e.g., the processor 410) may make a setting to provide third location data with a third degree of accuracy that includes a further simplified address, such as "Seoul, South Korea," which includes the city or county name. For example, the electronic device 400 (e.g., the processor 410)

may further display a map screen corresponding to the further simplified address "Seoul, South Korea."

Figure 15F:
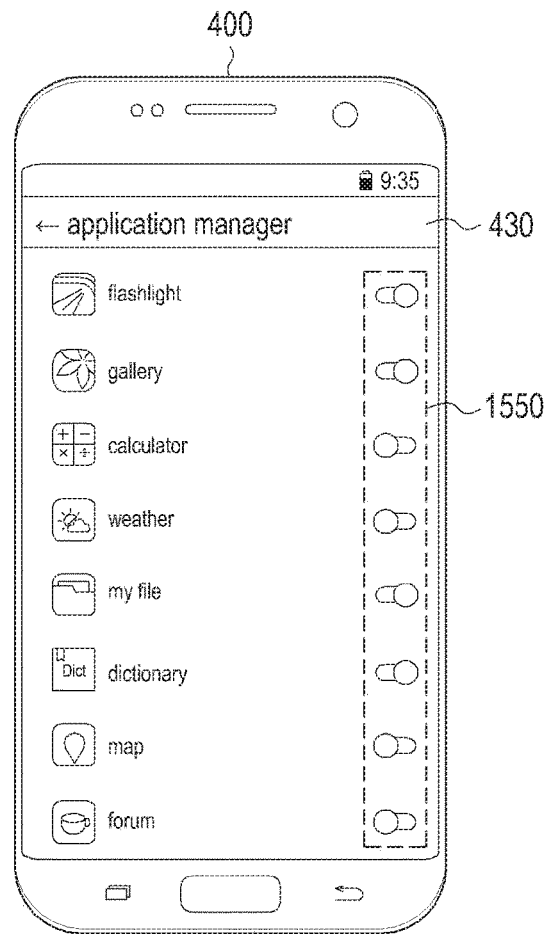

Referring to FIG. 15F, the electronic device 400 (e.g., the processor 410) may display a list of at least one application and buttons 1550 for activating a function for providing the first location data or second location data corresponding to each application. For example, upon receipt of a user input for moving right each of the buttons corresponding to a flashlight, gallery, file, and dictionary application, the electronic device 400 (e.g., the processor 410) may make a setting to provide the second location data to the flashlight, gallery, file, and dictionary applications. For example, upon receipt of a user input for moving left each of the buttons corresponding to a calculator, weather, map, and social media application, the electronic device 400 (e.g., the processor 410) may make a setting to provide the first location data to the calculator, weather, map, and social media applications. Thus, location data with different degrees of accuracy may be provided to multiple applications in an easier and more convenient way, thus preventing privacy intrusion or personal information leakage.

Figure 16A:
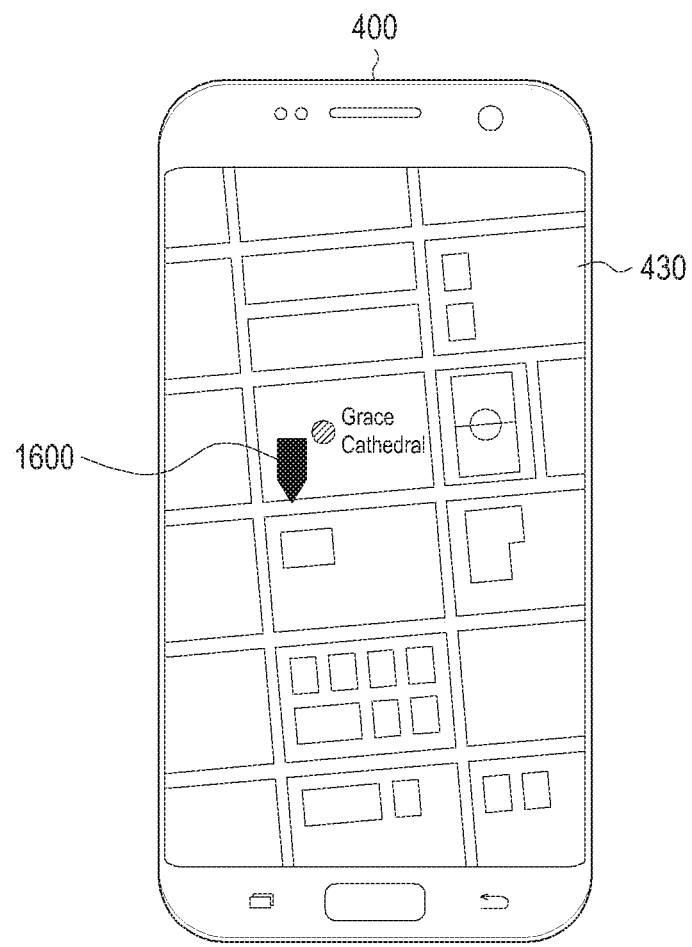
FIGS. 16A and 16B are views illustrating examples of user interfaces for providing a location-based service based on first location data and a location-based service based on second location data according to various embodiments of the present disclosure.
Figure 16B:
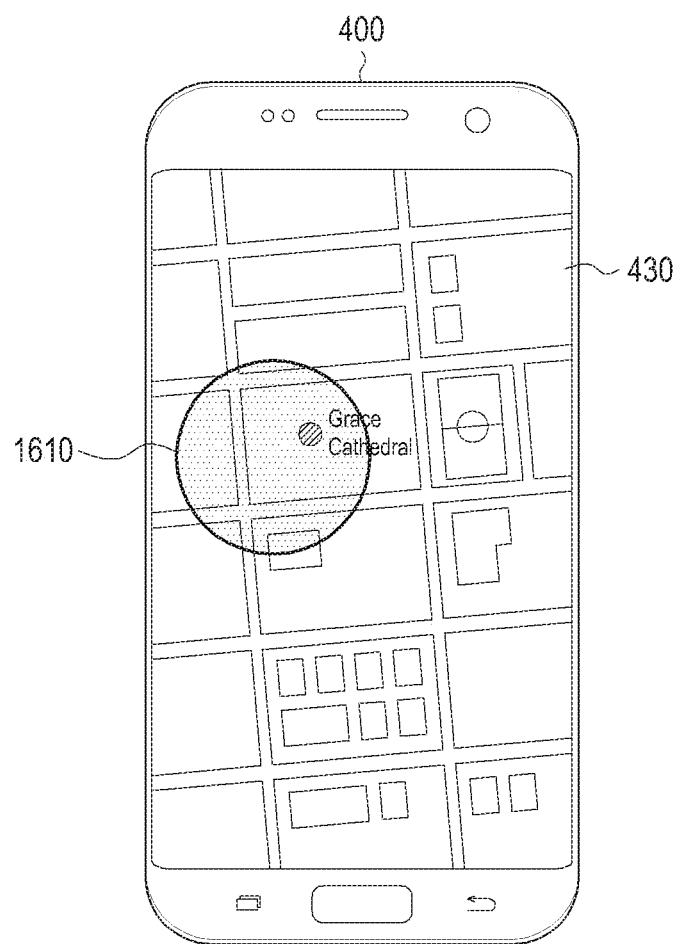

FIGS. 16A and 16B are views illustrating examples of user interfaces for providing a location-based service based on first location data and a location-based service based on second location data according to various embodiments of the present disclosure.

According to an embodiment of the present disclosure, upon receipt of a request to provide location data from a map application, the electronic device 400 (e.g., the processor 410) may determine whether to provide first location data or second location data to the map application according to an accuracy determination standard.

Referring to FIG. 16A, upon determining to provide the first location data, the electronic device 400 (e.g., the processor 410) may display a first indicator 1600 that indicates the location of the user on the map based on the detailed address of the current location of the electronic device 400, as shown in FIG. 16A. For example, the first location data may be "intersection in front of Grace Cathedral, California St., California, U.S.A."

Referring to FIG. 16B, upon determining to provide the second location data, the electronic device 400 (e.g., the processor 410) may display a second indicator 1610 that indicates the user's location on the map based on location data for a particular area larger than the current location of the electronic device 400 as shown in FIG. 16B. For example, the second location data may be "California St., Calif., U.S.A" or "near Grace Cathedral, Calif., U.S.A."

Figure 17A:
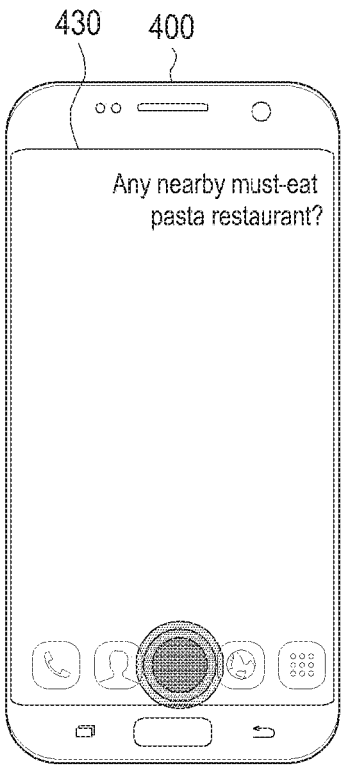
FIGS. 17A, 17B, and 17C are views illustrating an example of providing a location-based service in an electronic device according to various embodiments of the present disclosure.
Figure 17B:
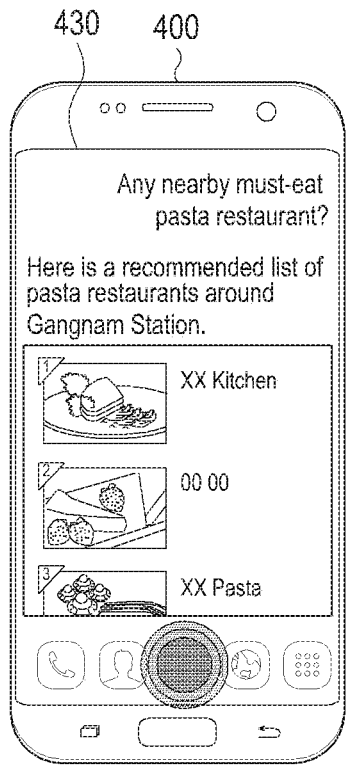
Figure 17C:
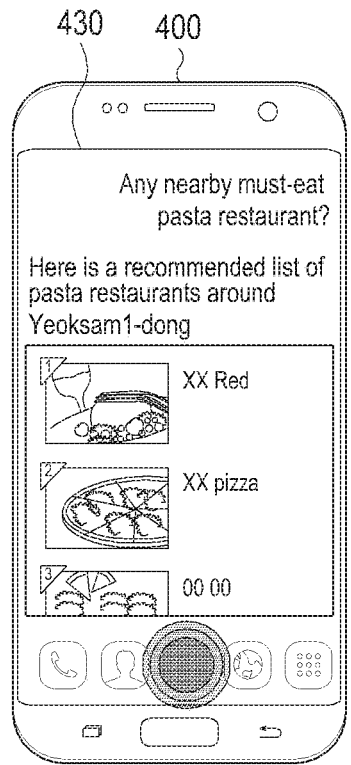

FIGS. 17A, 17B, and 17C are views illustrating an example of providing a location-based service in an electronic device according to an embodiment of the present disclosure.

Referring to FIGS. 17A, 17B and 17C, the electronic device 400 (e.g., the processor 410) may receive a user input for requesting location-based service information through the user interface 430.

Upon receipt of a user input to run a first program that provides a location-based service based on voice recognition through the user interface 430, the electronic device 400 (e.g., the processor 410) may run the first program and display an execution screen for the first program as shown in FIG. 17A.

Upon receipt of a voice input, e.g., "Any nearby must-eat restaurant?" the electronic device 400 (e.g., the processor 410) may provide service information using first location data with a first degree of accuracy regarding the location of the electronic device 400 which is gathered through the location sensor 420 based on an accuracy determination standard or service information using second location data with a second degree of accuracy lower than the first degree of accuracy of the first location data.

For example, when the user's current location corresponds to a second location set to provide the second location data, the electronic device 400 (e.g., the processor 410) may search for pasta restaurants located around Gangnam station based on the station name (e.g., Gangnam station) corresponding to the user's current location (e.g., Yeoksam1-dong, Gangnam-gu, Seoul) and display information about a searched pasta restaurant (e.g., its name, pictures, location, contact information, rating, reviews, or menu) as shown in FIG. 17B.

When the user's current location corresponds to a first location set to provide the first location data, the electronic device 400 (e.g., the processor 410) may search for pasta restaurants located around Yeoksam1-dong based on the detailed address (e.g., Yeoksam1-dong, Gangnam-gu, Seoul) corresponding to the user's current location and display information about a searched pasta restaurant as shown in FIG. 17C.

According to the embodiments of the present disclosure, the user may receive LBSs in a convenient manner, free from invasion of privacy or information leakage due to the provision of the user's location information.

As used herein, the term "module" includes a unit configured in hardware, software, or firmware and may interchangeably be used with other terms, e.g., "logic," "logic block," "part," or "circuit." The module may be a single integral part or a minimum unit or part of performing one or more functions. The module may be implemented mechanically or electronically and may include, e.g., an application-specific IC (ASIC) chip, field-programmable gate arrays (FPGAs), or programmable logic device, that has been known or to be developed in the future as performing some operations. According to an embodiment of the present disclosure, at least a part of the device (e.g., modules or their functions) or method (e.g., operations) may be implemented as instructions stored in a non-transitory computer-readable recording medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., compact disc-read only memory (CD-ROM), DVD, magnetic-optical medium (e.g., floptical disk), or an embedded memory. The instruction may include a code created by a compiler or a code executable by an interpreter. Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

As is apparent from the foregoing description, according to the embodiments of the present disclosure, the user may receive LBSs in a convenient manner, free from invasion of privacy or information leakage due to the provision of the user's location information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   a user interface;
   a location sensor configured to sense a location of the electronic device;
   a processor electrically connected with the user interface and the location sensor; and
   a memory electrically connected with the processor and configured to store a first application program and a second application program,
   wherein the memory is further configured to store instructions that, when executed, configure the processor to:
      receive, from the location sensor, first location data with a first degree of accuracy regarding the location of the electronic device,
      based on the first location data being received, process at least part of the first location data according to accuracy determination data, which includes at least one of various data about the electronic device or user configuration data set by a user input, to generate second location data with a second degree of accuracy lower than the first degree of accuracy regarding the location of the electronic device,
      after generating the second location data, determine whether the first application program is able to display information on the first location data and whether the second application program is able to display information on the second location data,
      in response to determining that the first application program is able to display the information on the first location data, provide the at least part of the first location data to execute the first application program, and display a first indicator based on a detailed address of a current location of the electronic device indicating the information on the first location data and first latitude-longitude coordinates corresponding to the first location data on an execution screen of the first application program, and
      in response to determining that the second application program is able to display the information on the second location data, provide at least part of the second location data to execute the second application program, and display a second indicator, different from the first indicator, based on location data of a particular area larger than the detailed address of the current location indicating the information on the second location data and second latitude-longitude coordinates corresponding to the second location data on an execution screen of the second application program, wherein the first latitude-longitude coordinates have more decimal places than the second latitude-longitude coordinates, and
   wherein the user configuration data set by the user input comprises first set data indicating whether to provide the first location data or the second location data and second set data indicating a user adjusted degree of accuracy set as the second degree of accuracy of the second location data.

2. The electronic device of claim 1,
   wherein the first location data comprises raw location data from the location sensor and the second location data comprises only area information that covers the raw location data, and
   wherein the user interface is configured to display a list of at least one application program that includes the first application program and the second application program, each application program of the list including a corresponding button for activating a function for providing one of the first location data or the second location data.

3. The electronic device of claim 1,
   wherein the first location data comprises a full address for the location of the electronic device, and
   wherein the second location data comprises only area information covering the full address.

4. The electronic device of claim 1,
   wherein the memory is further configured to store a third application program, and
   wherein the instructions, when executed, further configure the processor to:
      process at least part of at least one of the first location data or the second location data to generate third location data with a third degree of accuracy regarding the location of the electronic device, the third degree of accuracy being lower than the second degree of accuracy, and
      provide at least part of the third location data to execute the third application program.

5. The electronic device of claim 1, wherein the instructions, when executed, further configure the processor to allow a user to select the first location data for the first application program and the second location data for the second application program through the user interface.

6. The electronic device of claim 1, wherein the instructions, when executed, further configure the processor to:
   determine a context based on at least part of a user input through the user interface,
   select the first location data to execute the first application program, and
   select the second location data to execute the second application program.

7. The electronic device of claim 1, wherein the location sensor is further configured to include at least one of a global positioning system (GPS) sensor, a bluetooth (BT) circuit, a Wi-Fi circuit, or a cellular communication circuit.

8. The electronic device of claim 1, wherein the instructions, when executed, further cause the processor to, as part of determining whether the first application program is able to display information on the first location data and whether the second application program is able to display information on the second location data, determine whether the first application program and the second application program are currently running on the electronic device.

9. The electronic device of claim 1,
   wherein the first application program is determined as being able to display the information on the first location data based on the first application program being an application of user interest, and
   wherein the second application program is determined as being able to display the information on the second location data based on the second application program being an application of no user interest.

10. The electronic device of claim 9,
   wherein the first application program is determined as the application of user interest based on the first application program comprising an application that provides at least one of a map service, a navigation service, or information about must-eat restaurants, and
   wherein the second application program is determined as the application of no user interest based on the second application program comprising at least one of a flashlight application, an application providing a coupon service, or a game-related application.

11. The electronic device of claim 1, wherein the instructions, when executed, further configure the processor to:
based on determining that the first application program is able to display the information on the first location data, display, on the execution screen of the first application program, text of a location corresponding to the detailed address adjacent to the first indicator, and
based on determining that the second application program is able to display the information on the second location data, display, on the execution screen of the second application program, at least part of the location corresponding to the detailed address within a region of the second indicator.

12. An electronic device, comprising:
a user interface;
a location sensor configured to sense a location of the electronic device;
a processor electrically connected with the user interface and the location sensor; and
a memory electrically connected with the processor,
wherein the memory is configured to store instructions that, when executed, configure the processor to:
receive, from the location sensor, first location data regarding the location of the electronic device,
based on the first location data being received, obtain second location data corresponding to the first location data according to accuracy determination data, which includes at least one of various data about the electronic device or user configuration data set by a user input,
after obtaining the second location data, determine whether a first application that is executed on the electronic device is able to display information on the first location data or information on the second location data,
in response to determining that the first application is able to display the information on the first location data, provide at least part of the first location data to the first application, and display a first indicator based on a detailed address of a current location of the electronic device indicating the information on the first location data and first latitude-longitude coordinates corresponding to the first location data on an execution screen of the first application, and
in response to determining that the first application is able to display information on the second location data, provide at least part of the second location data to the first application, and display a second indicator, different from the first indicator, based on location data of a particular area larger than the detailed address of the current location indicating the information on the second location data and second latitude-longitude coordinates corresponding to the second location data on the execution screen of the first application, wherein the first latitude-longitude coordinates have more decimal places than the second latitude-longitude coordinates, and
wherein the user configuration data set by the user input comprises first set data indicating whether to provide the first location data or the second location data and second set data indicating a user adjusted degree of accuracy set as a second degree of accuracy of the second location data.

13. The electronic device of claim 12, wherein the instructions, when executed, further configure the processor to:
determine whether the location of the electronic device corresponds to a first location that is set to provide the first location data or a second location that is set to provide the second location data,
in response to determining that the location of the electronic device corresponds to the first location, provide at least part of the first location data, and
in response to determining that the location of the electronic device corresponds to the second location, provide the at least part of the second location data.

14. The electronic device of claim 12, wherein the instructions, when executed, further configure the processor to:
gather time data regarding a time of the electronic device,
determine whether the gathered time data corresponds to a first time that is set to provide the first location data or a second time that is set to provide the second location data,
in response to determining that the gathered time data corresponds to the first time, provide at least part of the first location data, and
in response to determining that the gathered time data corresponds to the second time, provide the at least part of the second location data.

15. The electronic device of claim 12, wherein the instructions, when executed, further configure the processor to:
gather schedule data regarding a schedule of the electronic device,
determine whether the gathered schedule data corresponds to a first schedule that is set to provide the first location data or a second schedule that is set to provide the second location data,
in response to determining that the gathered schedule data corresponds to the first schedule, provide at least part of the first location data, and
in response to determining that the gathered schedule data corresponds to the second schedule, provide the at least part of the second location data.

16. The electronic device of claim 12, wherein the instructions, when executed, further configure the processor to:
gather context data regarding a context of the electronic device,
determine whether the gathered context data corresponds to a first status that is set to provide the first location data or a second status that is set to provide the second location data,
in response to determining that the gathered context data corresponds to the first status, provide at least part of the first location data, and
in response to determining that the gathered context data corresponds to the second status, provide the at least part of the second location data.

17. The electronic device of claim 12, wherein the instructions, when executed, further configure the processor to:
gather application use data regarding an application use history of the electronic device,
determine whether the gathered application use data corresponds to a first application that is set to provide the first location data or a second application that is set to provide the second location data,
in response to determining that the gathered application use data corresponds to the first application, provide at least part of the first location data, and
in response to determining that the gathered application use data corresponds to the second application, provide the at least part of the second location data.

18. A non-transitory recording medium storing commands to execute a method for controlling an electronic device, the commands being configured to be executed by at least one processor to configure the at least one processor to perform at least one operation, the at least one operation comprising:
receiving, from a location sensor, first location data with a first degree of accuracy regarding a location of the electronic device;
based on the first location data being received, processing at least part of the first location data according to accuracy determination data, which includes at least one of various data about the electronic device or user configuration data set by a user input, to generate second location data with a second degree of accuracy lower than the first degree of accuracy regarding the location of the electronic device;
after generating the second location data, determining whether a first application program is able to display information on the first location data and whether a second application program is able to display information on the second location data;
in response to determining that the first application program is able to display information on the first location data, providing the at least part of the first location data to execute the first application program, and display a first indicator based on a detailed address of a current location of the electronic device indicating the information on the first location data and first latitude-longitude coordinates corresponding to the first location data on an execution screen of the first application program; and
in response to determining that the second application program is able to display information on the second location data, providing at least part of the second location data to execute the second application program, and display a second indicator, different from the first indicator, based on location data of a particular area larger than the detailed address of the current location indicating the information on the second location data and second latitude-longitude coordinates corresponding to the second location data on an execution screen of the second application program,
wherein the first latitude-longitude coordinates have more decimal places than the second latitude-longitude coordinates, and
wherein the user configuration data set by the user input comprises first set data indicating whether to provide the first location data or the second location data and second set data indicating a user adjusted degree of accuracy set as the second degree of accuracy of the second location data.

19. The non-transitory recording medium of claim 18,
wherein the first location data comprises raw location data from the location sensor and the second location data comprises only area information that covers the raw location data, and
wherein a user interface of the electronic device is configured to display a list of at least one application program that includes the first application program and the second application program, each application program of the list including a corresponding button for activating a function for providing one of the first location data or the second location data.

20. The non-transitory recording medium of claim 18,
wherein the first location data includes a full address for the location of the electronic device, and
wherein the second location data includes only area information covering the full address.

21. The non-transitory recording medium of claim 18, wherein the at least one operation further comprises:
processing at least part of at least one of the first location data or the second location data to generate third location data with a third degree of accuracy lower than the second degree of accuracy regarding the location of the electronic device; and
providing at least part of the third location data to execute a third application.

22. The non-transitory recording medium of claim 18, wherein the at least one operation further comprises allowing a user to select the first location data for the first application program and the second location data for the second application program through a user interface.

23. The non-transitory recording medium of claim 18, wherein the at least one operation further comprises:
determining a context based on at least part of a user input through a user interface;
selecting the first location data to execute the first application program; and
selecting the second location data to execute the second application program.

24. The non-transitory recording medium of claim 18, wherein the location sensor includes at least one of a global positioning system (GPS) sensor, a bluetooth (BT) circuit, a Wi-Fi circuit, or a cellular communication circuit.

* * * * *